US012440488B2

(12) United States Patent
Voelkel et al.

(10) Patent No.: US 12,440,488 B2
(45) Date of Patent: Oct. 14, 2025

(54) METHODS AND COMPOSITIONS FOR TREATING CHRONIC OBSTRUCTIVE PULMONARY DISEASE, ASTHMA, PNEUMONIA, BRONCHITIS, CYSTIC FIBROSIS, PULMONARY EDEMA, INTERSTITIAL LUNG DISEASE, SARCOIDOSIS, IDIOPATHIC PULMONARY FIBROSIS, ACUTE RESPIRATORY DISTRESS SYNDROME, AND PULMONARY ARTERIAL HYPERTENSION

(71) Applicant: ReversPAH LLC, Denver, CO (US)

(72) Inventors: Norbert F. Voelkel, Denver, CO (US); Charles Magolske, Denver, CO (US); Erik R. Eglite, Lake Forest, IL (US)

(73) Assignee: ReversPAH LLC, Denver, CO (US)

(*) Notice: Subject to any disclaimer, the term of this patent is extended or adjusted under 35 U.S.C. 154(b) by 117 days.

(21) Appl. No.: 17/539,470

(22) Filed: Dec. 1, 2021

(65) Prior Publication Data

US 2022/0168297 A1 Jun. 2, 2022

Related U.S. Application Data

(60) Provisional application No. 63/119,827, filed on Dec. 1, 2020.

(51) Int. Cl.

| | |
|---|---|
| A61K 31/495 | (2006.01) |
| A61K 9/00 | (2006.01) |
| A61K 31/137 | (2006.01) |
| A61K 31/167 | (2006.01) |
| A61K 31/381 | (2006.01) |
| A61K 31/5386 | (2006.01) |
| A61K 31/5575 | (2006.01) |
| A61K 31/5578 | (2006.01) |
| A61K 31/5585 | (2006.01) |
| A61K 31/573 | (2006.01) |

(52) U.S. Cl.
CPC ............ *A61K 31/495* (2013.01); *A61K 9/008* (2013.01); *A61K 31/137* (2013.01); *A61K 31/167* (2013.01); *A61K 31/381* (2013.01); *A61K 31/5386* (2013.01); *A61K 31/5575* (2013.01); *A61K 31/5578* (2013.01); *A61K 31/5585* (2013.01); *A61K 31/573* (2013.01)

(58) Field of Classification Search
CPC .... A61K 31/495; A61K 9/008; A61K 31/137; A61K 31/167; A61K 31/381; A61K 31/5386; A61K 31/5575; A61K 31/5578; A61K 31/5585; A61K 31/573; A61K 31/4965; A61K 9/007; A61K 47/55; A61P 11/00

See application file for complete search history.

(56) References Cited

U.S. PATENT DOCUMENTS

| 3,895,111 A * | 7/1975 | Corey, Jr. ............ | A61K 9/0075 514/255.01 |
| 3,956,330 A * | 5/1976 | Corey, Jr. ............ | A61M 15/009 514/826 |
| 3,985,868 A * | 10/1976 | Corey, Jr. ........... | C07D 295/215 222/395 |
| 2005/0201951 A1 | 9/2005 | Barr et al. | |
| 2007/0235029 A1* | 10/2007 | Zhu ...................... | A61M 15/002 128/203.15 |
| 2014/0018430 A1* | 1/2014 | Freissmuth ........ | A61K 31/4166 435/375 |

(Continued)

FOREIGN PATENT DOCUMENTS

| GB | 1471917 A * | 4/1977 | ........ A61M 15/0086 |
| WO | WO-2018145185 A1 * | 8/2018 | ........... A61K 31/495 |
| WO | 2022155544 A1 | 7/2022 | |

OTHER PUBLICATIONS

Wang, WL., Kuo, CH., Chu, YT. et al. Prostaglandin I2 analogues suppress TNF-α expression in human monocytes via mitogen-activated protein kinase pathway. Inflamm. Res. 60, 655-663 (2011). (Year: 2011).*

Aires et al., Respiratory mechanics after chronic diethylcarbamazine, Respiration Physiology 108 (1997) 73-77. (Year: 1997).*

(Continued)

*Primary Examiner* — Frederick F Krass
*Assistant Examiner* — Abdulrahman Abbas
(74) *Attorney, Agent, or Firm* — Maier & Maier, PLLC

(57) ABSTRACT

A method of treating COPD, Asthma, Pneumonia, Bronchitis, Cystic Fibrosis, Pulmonary Edema, Interstitial Lung Disease, Sarcoidosis, Idiopathic Pulmonary Fibrosis and PAH in a patient. One embodiment includes administering a vasodilator prostacyclin analogue, such as Beraprost or Iloprost, separately or together with a form of Diethylcarbamazine or Zileuton. Other embodiments may include fluvoxamine. The vasodilator prostacyclin analogue is inhaled. Diethylcarbamazine/Zileuton is inhaled into the lung or administered orally or intravenously. Other embodiments include fluvoxamine. This treatment reduces the progression of the disease, reduces life-threatening exacerbations, and improves the quality of life. The treatment is also for COPD patients with eosinophilia who are incompletely treated with steroids and addresses steroid-unresponsive disease components of COPD including pulmonary hypertension and intravascular inflammation and bronchiectasis. The treatment may include a PDE4 inhibitor and current treatments with existing steroids and beta-adrenergic receptor agonists and/or muscarinic receptor blockers. The treatment is also for ARDS and COVID-19.

24 Claims, 5 Drawing Sheets

(56) References Cited

U.S. PATENT DOCUMENTS

| | | | |
|---|---|---|---|
| 2014/0163001 A1* | 6/2014 | Yamamoto | A61P 43/00 544/58.4 |
| 2015/0272936 A1 | 10/2015 | Vakkalanka et al. | |
| 2018/0353511 A1* | 12/2018 | Esther, Jr. | C07D 487/04 |
| 2019/0383830 A1 | 12/2019 | Sin et al. | |
| 2020/0289768 A1 | 9/2020 | Shahaf et al. | |
| 2020/0369623 A1 | 11/2020 | Martin et al. | |

OTHER PUBLICATIONS

Lee et al., Effect of Beraprost Sodium in Patients with ChronicObstructive Pulmonary Disease, Tuberculosis and Respiratory Diseases 2004; 57(4): 320-328. (Year: 2004).*

Karlage et al., "Inhalation of an Ethanol-Based Zileuton Formulation Provides a Reduction of Pulmonary Adenomas In the A/J Mouse Model", AAPS PharmSciTech, vol. 11, No. 1, Mar. 2010, pp. 168-173.

Woodruff et al., "Randomized Trial of Zileuton for Treatment of COPD Exacerbations Requiring Hospitalization", NIH Public Access Author Manuscript, Feb. 2011, 18 pages.

Notification of Transmittal of the International Search Report and the Written Opinion of the International Searching Authority, or the Declaration issued on Apr. 18, 2022 in corresponding International Application No. PCT/US21/61393; 18 pages.

Extended Search Report issued on Mar. 20, 2025, in corresponding European Application No. 21901378.6, 12 pages.

Database Embase, Elsevier Science Publishers, Database accession No. EMB-5112036, abstract, XP002813092, Sly et al., "Effect of A61P11/00 Diethylcarbamazine Pamoate Upon Exercise A61K31/137 Induced Obstruction in Asthmatic A61K31/167 Children", Annals of Allergy, Elsevier B.V., ISSN: 0003-4738, 1974, vol. 33, No. 3, 1 page.

* cited by examiner

Maps of Lungs without and with COPD

Quantitative maps of pulmonary blood flow of participants with varying COPD severities and a participant without COPD.

Diagram that Illustrates the disease manifestation. DEC may be substituted with Zileuton and Beraprost may be substituted with Iloprost or another vasodilator.

Figure 4

COPD Pathobiological spectrum: From cigarette smoke to smoldering inflammation

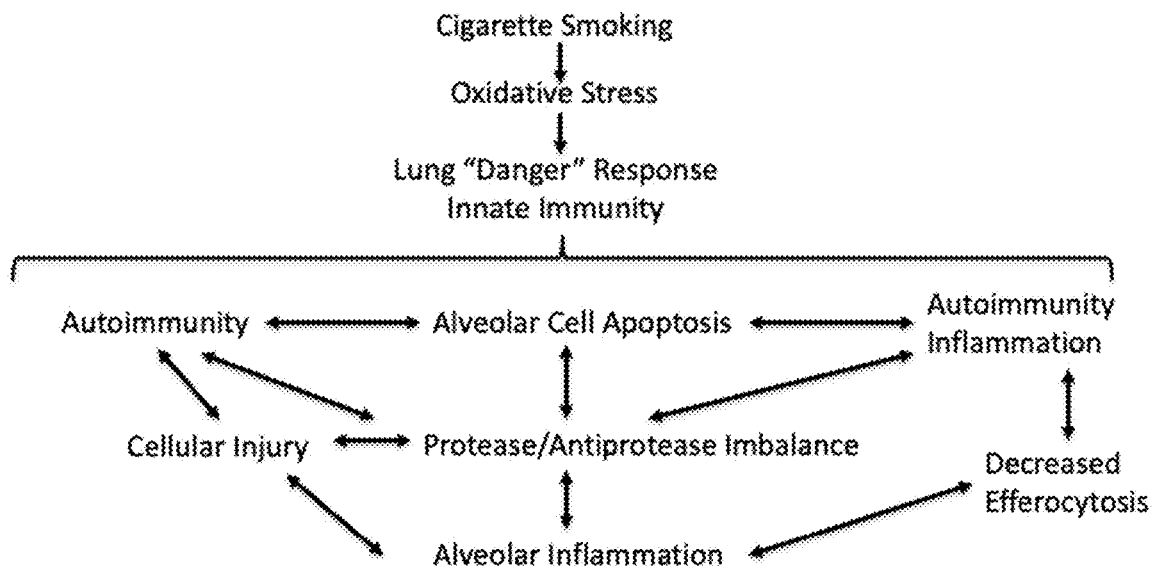

Cigarette smoking induces a "danger" like response in the lung, with a resetting of the injury threshold by oxidative stress. Disruption of alveolar maintenance is directly affected by abnormal inflammation potentially leading to autoimmune responses. Protease / antiprotease imbalance and inflammation may lead to dysfunctional efferocytosis. These processes are mutually interactive and may lead to self-propagating alveolar injury despite the interruption of smoking

Figure 5

COPD Risk Factors

| Risk Factors for Chronic Obstructive Pulmonary Disease | | |
|---|---|---|
| External | Internal | Other |
| Smoking | Genetic Factors | Airway Hyperresponsiveness, IgE*, and Asthma |
| Socioeconomic Status | Gender | Environmental Pollution |
| Occupation | Chronic Mucus Hypersecretion | Perinatal Events and Childhood Respiratory Illness |
| | | Diet |

Figure 6

| | Conventional Beta Agonist and Steroid Medication | DEC | Beraprost |
|---|---|---|---|
| bronchospasm | ● | ● | |
| pulmonary vasoconstriction | | ● | ● |
| Anti Inflammatory | ● | ● | ● |
| oxidant stress inhibition | | ● | |
| anti-fibrotic action | | ● | ● |
| vasodilator | | | ● |
| Improves Gas Exchange | | | ● |
| Blocks Leukotriene production | | ● | |
| Provides anti-viral support | | ● | |

METHODS AND COMPOSITIONS FOR TREATING CHRONIC OBSTRUCTIVE PULMONARY DISEASE, ASTHMA, PNEUMONIA, BRONCHITIS, CYSTIC FIBROSIS, PULMONARY EDEMA, INTERSTITIAL LUNG DISEASE, SARCOIDOSIS, IDIOPATHIC PULMONARY FIBROSIS, ACUTE RESPIRATORY DISTRESS SYNDROME, AND PULMONARY ARTERIAL HYPERTENSION

FIELD

The present invention concerns methods and compositions for treating pulmonary diseases and conditions. In particular, the invention concerns compositions of diethylcarbamazine, prostacyclin analogues, and selective serotonin reuptake inhibitors for treating chronic obstructive pulmonary disease, interstitial lung disease, asthma, bronchitis, pneumonia, cystic fibrosis, pulmonary edema, sarcoidosis, idiopathic pulmonary fibrosis, pulmonary arterial hypertension, and acute respiratory distress syndrome.

BACKGROUND

Chronic obstructive pulmonary disease (COPD) is functionally defined as a chronically increased resistance to airflow and is a condition in which the lung's airways become inflamed and narrowed and the air sacs become damaged. COPD is a major cause of morbidity and mortality around the globe. In many patients with COPD, the disease is chronic and progressive, and they have disease exacerbations which have an impact on morbidity and mortality.

Symptoms of COPD include cough, dyspnea (shortness of breath) and exercise limitation (due to narrowed airways & hyperinflation) and sputum production. Patients with COPD often have other manifestations such as bronchospasm, a reactive airway component, lung hyperinflation (emphysema), and pulmonary hypertension.

COPD is the third leading cause of death in the United States. More than 15 million people have been diagnosed with COPD, but millions more may have the disease without even knowing it. COPD causes serious long-term disability and early death. Currently there is no cure, and the number of people dying from COPD is growing. About 800,000 COPD patients are hospitalized per year in the United States. The global prevalence is estimated to be greater than 10 percent, impacting approximately 380 million people worldwide. It has been estimated that by 2030, COPD will be one of the leading causes of death worldwide.

COPD is characterized by a progressive lung tissue destruction, chronic smoldering inflammation, and exacerbations which over time continue to worsen the prognosis. FIG. 3 characterizes COPD exacerbations.

There is a paucity of drugs provided by a number of major drug companies and these are: (1) Beta-adrenergic receptor agonists—they are bronchodilators, (2) inhaled corticosteroids to treat airway inflammation, (3) muscarinic receptor blockers or—anticholinergics, they can provide some bronchodilator effect, and (4) a phosphodiesterase 4 inhibitor which has anti-inflammatory actions (PDE4) and (5) anticholinergics that inhibit nerve impulses responsible for involuntary muscle movements.

COPD is not one disease; COPD should be viewed as a spectrum of disease presentations and pathologies which today are either incompletely treated or not treated at all. For example, there is an asthma/COPD overlap as well and a COPD/pulmonary hypertension phenotype. There are patients that have a very complex lung disease presenting with a combination of emphysema, fibrosis, and pulmonary hypertension. There are several recognized phenotypes: (1) a bronchitic phenotype (and some of these patients develop bronchiectasis), (2) an emphysema phenotype (3) a pulmonary hypertensive phenotype and a COPD/Asthma overlap phenotype that is characterized by eosinophilia.

In COPD/emphysema: all compartments of the lung are involved; the airways, the interstitial space, and the lung vessels. There are also systemic disease manifestations.

COPD patients can develop bronchiectasis, an inflammatory enlargement of airways that can be seen when imaging the lung, especially using CT scans. The importance of bronchiectasis is the often-antibiotic treatment resistant inflammation that also is responsible for COPD exacerbations.

Patients with COPD may have inflamed airways, fibrosis, muscularized arterioles, vessel loss, in situ thrombosis and thromboembolism. FIG. 1 illustrates the much lower blood flow in patients with COPD in part due to a loss of blood vessels.

Most patients are being treated with the combination of a long-acting beta-adrenergic agonist (LABA) and an inhaled steroid, example Advair (Glaxo); the steroid is supposed to treat the airway inflammation, however, there is a steroid-resistant inflammatory component. Frequently this combination is further combined with an inhaled muscarinic receptor blocker (example: tiotropium).

Some patients are receiving oral glucocorticoids in addition to inhaled steroids to treat the inflammation. Oral glucocorticoids are known to increase the risk of pneumonia osteoporosis and cataracts in COPD patients Despite the treatment with these drugs, mostly offered as a combination therapy, COPD is progressive in many patients and exacerbations still occur. Of great importance, the presently available drugs do not modify the underlying pathology.

Most of the present drugs contain a steroid as one of the main active pharmaceutical ingredients and the steroid makes some patients susceptible to pneumonia and *Haemophilus influenzae* and other viral and bacterial airway infections.

There are COPD patients that never achieve control of their disease in spite of treatment with existing drugs and experience so-called frequent exacerbators. Their disease is steroid-unresponsive, and they are susceptible to develop viral and bacterial airway infections. Exacerbations of COPD often require hospitalization and many patients after such an event do not fully recover. The mortality in patients with the "frequent exacerbator phenotype" is increased.

The presently used drugs do not treat the lung vascular disease component.

The presently used drugs, which include steroids, do not effectively treat the pulmonary vascular disease components (Pulmonary hypertension and pulmonary thrombosis). Many patients with the COPD/Asthma overlap syndrome are also incompletely treated with the presently used agents.

The steroid-resistant inflammatory component manifests itself in disease exacerbations. Disease exacerbations causing hospitalizations are attempted to be reduced by adding the orally available PDE4 inhibitor roflumilast. The presently used drugs do not protect against viral and bacterial infections.

It is generally accepted that smoking and exposure to smoke, can cause COPD, however this is not the sole cause. FIG. 4 diagrammatically illustrates the pathways that lead from cigarette smoking to the smoldering inflammation of COPD. FIG. 5 illustrates the range of COPD risk factors.

Women are more vulnerable than men to lung damage from cigarette smoke and other pollutants. Their lungs are smaller, and estrogen may play a role in worsening lung disease.

Other putative risk factors include an abnormal sensitivity and exaggerated response to inhaled substances and other exposures such as second-hand smoking, use of biomass fuels, exposure to environmental dust or organic material in the workplace, or exposure to air pollution.

COPD is diagnosed through spirometry, which can detect COPD even in people who do not yet have symptoms. Currently, there is no cure for COPD, although available therapy can improve symptoms, quality of life, and prevent acute worsening of the disease. Further, the primary treatments today are various steroids, and while the industry is divided as to their benefit to COPD patients without asthma, it is clear that non-asthmatic patients and other subsets of COPD need a better treatment.

Patients with COPD die from pneumonia or heart failure as a consequence of chronic hypoxia and/or pulmonary hypertension.

Anyone can get interstitial lung disease, including children. Many things can increase the risk of or cause ILDs including a genetic predisposition, certain medications, or medical treatments such as radiation or chemotherapy. Exposure to hazardous materials has been linked to ILDs such as asbestosis and hypersensitivity pneumonitis. People with autoimmune diseases such as scleroderma or rheumatoid arthritis are also at increased risk of developing ILD. Unfortunately, in many cases, such as in idiopathic pulmonary fibrosis, the cause is unknown.

The most common symptom of all ILDs is shortness of breath. This is often accompanied by a dry cough, chest discomfort, fatigue and occasionally weight loss. In most cases, by the time the symptoms appear lung damage has already occurred. Severe cases that are left untreated can develop life-threatening complications including pulmonary hypertension, heart, or respiratory failure.

Treatment for ILDs varies depending on the type of ILD diagnosed and the severity. Lung damage from ILDs is often irreversible and progressive, treatment normally centers on relieving symptoms, improving quality of life and slowing the disease's progression. Medications, mostly ineffective, such as corticosteroids, can be used to decrease inflammation in the lungs.

Nintedanib (Boehringer) has recently been shown to reduce the annual decrease in the functional capacity (FVC) by an average of 50%. Supplemental oxygen therapy is another common treatment because it helps deliver extra oxygen to make breathing easier and lessen complications from low blood oxygen levels, such as heart failure. Pulmonary rehabilitation may also be recommended to improve daily life by giving patients techniques to improve respiratory mechanics, physical endurance and offer emotional support. In the most extreme cases, people with ILDs will be recommended for lung transplantation.

Asthma is a long-term condition affecting children and adults. The air passages in the lungs become narrow due to inflammation and tightening of the muscles around the small airways. This causes asthma symptoms: cough, wheeze, shortness of breath and chest tightness. These symptoms are intermittent and are often worse at night or during exercise. Other common "triggers" can make asthma symptoms worse. Triggers vary from person to person, but can include viral infections (colds), dust (house dust mites), smoke, fumes, changes in the weather, grass and tree pollen, animal fur and feathers, strong soaps, and perfume. Many different factors have been linked to an increased risk of developing asthma, although it is often difficult to find a single, direct cause. Currently there is no cure for Asthma, only symptomatic relief, and avoidance of triggers Although asthma is one of the most common chronic diseases of childhood, adults can also develop asthma, even at an old age. Asthma affects more than 6 million children (see also Asthma in Children) in the United States and occurs more frequently in boys before puberty and in girls after puberty. There is an association between obesity and asthma. Asthma can eventually resolve in children. However, sometimes asthma that appears to resolve recurs years later.

Asthma also occurs more frequently in non-Hispanic blacks and Puerto Ricans.

Although the number of people affected by asthma has increased, the number of deaths has decreased.

The most important characteristic of asthma is narrowing of the airways that can be reversed to a varying degrees. The airways of the lungs (the bronchi) are basically tubes with muscular walls. Cells lining the bronchi have microscopic structures, called receptors. These receptors sense the presence of specific substances and stimulate the underlying muscles to contract or relax, thus altering the flow of air. There are many types of receptors, but two main types of receptors are important in asthma:

Beta-adrenergic receptors respond to chemicals such as epinephrine and make the muscles relax, thereby widening (dilating) the airways and increasing airflow.

Cholinergic receptors respond to a chemical called acetylcholine and make the muscles contract, thereby decreasing airflow.

The causes of asthma are unknown, but asthma likely results from complex interactions between many genes, environmental conditions, and nutrition. Environmental conditions and circumstances around pregnancy, birth, and infancy have been associated with the development of asthma in childhood and later in adulthood. Risk appears to be higher if a person's mother became pregnant at a young age or had poor nutrition during pregnancy. Risk may also be higher if someone is born prematurely, had a low weight at birth, or was not breastfed. Environmental conditions such as exposures to household allergens (such as dust mites, cockroaches, and pet dander) and other environmental allergens have also been associated with the development of asthma in older children and adults. Diets low in vitamins C and E and in omega-3 fatty acids have been also linked to asthma, as has obesity; however, there is no evidence that dietary supplements of these substances prevent the development of asthma.

Narrowing of the airways is often caused by abnormal sensitivity of cholinergic receptors, which cause the muscles of the airways to contract when they should not. Certain cells in the airways, particularly mast cells, are thought to be responsible for initiating the response. Mast cells throughout the bronchi release substances such as histamine and leukotrienes, which cause the following: Smooth muscle to contract, Mucus secretion to increase, Certain white blood cells to move to the area and thus Inflammation.

Eosinophils, a type of white blood cell found in the airways of people with asthma, release additional substances, contributing to airway narrowing.

In an asthma attack (sometimes called a flare-up or an exacerbation), the smooth muscles of the bronchi contract, causing the bronchi to narrow (called bronchoconstriction).

The tissues lining the airways swell due to inflammation and mucus secretion into the airways. The top layer of the airway lining can become damaged and shed cells, further narrowing the airway. A narrower airway requires the person to exert more effort to breathe. In asthma, the narrowing is reversible, meaning that with appropriate treatment or on their own, the muscular contractions of the airways stop, inflammation resolves so that the airways widen again, and airflow into and out of the lungs returns to normal. Currently, reducing inflammation is vital for treatment of asthma. Anti-inflammatory drugs suppress the inflammation that narrows the airways. Anti-inflammatory therapy currently includes drugs like corticosteroids (which can be inhaled, taken by mouth, or given intravenously), leukotriene modifiers, and mast cell stabilizers. Drugs such as inhaled or oral corticosteroids, leukotriene modifiers, long-acting beta-adrenergic drugs, methylxanthines, antihistamines, or mast cell stabilizers are used to prevent attacks in most people with asthma. A minority of people with asthma have severe disease that remains uncontrolled, causing repeated attacks despite treatment with a combination of therapies. These people may benefit from treatment with drugs that block inflammation.

Bronchitis is usually caused by a viral upper respiratory tract infection. Symptoms are a cough that may or may not produce mucus (sputum). The diagnosis is based primarily on symptoms. Treatments, such as drugs to reduce fever and cough, may be used to make the person more comfortable until the episode ends. Antibiotics are rarely needed.

Bronchitis can be either Acute or Chronic.

Acute bronchitis usually lasts days to a few weeks. Bronchitis that lasts for months or years is usually classified as chronic bronchitis.

With chronic bronchitis the patient has decreased airflow from the lungs when they breathe out (airflow obstruction), they are considered to have chronic obstructive pulmonary disease (COPD). If people who have COPD, or other chronic lung disorders such as bronchiectasis or cystic fibrosis, develop symptoms of acute bronchitis, doctors consider this a flare-up of the underlying disorder rather than acute bronchitis.

Acute bronchitis is caused by infection due to Viruses (most common) and Bacteria.

Bronchitis occurs most often during the winter.

Viral bronchitis may be caused by a number of common viruses, including the influenza virus and the viruses that cause the common cold. Acute bronchitis can also occur as part of the SARS-CoV-2 infection. Even after a viral infection has cleared up, the irritation it causes can continue to cause symptoms for weeks.

Bacteria cause less than one in 20 cases of bronchitis. *Mycoplasma pneumoniae, Chlamydia pneumoniae, Hemophilus influenzae*, and *Bordetella pertussis* infection (which causes whooping cough) are among the bacteria that cause acute bronchitis. Bacterial causes of acute bronchitis are more likely when many people in the same area are affected at the same time (an outbreak).

Cough in adults has many causes besides acute bronchitis. Cough in children has similar causes as in adults.

Treatments to relieve symptoms include acetaminophen or ibuprofen to reduce fever and general feelings of illness and patients should drink plenty of fluid.

Antibiotics do not help viral bronchitis. Since most acute bronchitis is viral, doctors give antibiotics only when the infection is clearly caused by bacteria (for example, during an outbreak). When an antibiotic is used, doctors typically give a drug such as azithromycin or clarithromycin.

In children, very mild symptoms may be helped with cool-mist humidifiers or steam vaporizers. Children and adults who are wheezing may benefit from inhaled bronchodilators, which help open the airways and reduce wheezing.

Cough medicines can be used to suppress a cough that is distressing or interferes with sleep. However, the degree of effectiveness of these drugs is not clear. Expectorants are over-the-counter drugs that may help thin secretions and make them easier to cough up, but whether this measure is helpful is not clear.

Pneumonia is an infection deep in the lungs. The infection involves the small air sacs of the lungs (alveoli). Pneumonia is different from infection of the air passages (bronchi) in the 'lungs. Pneumonia can be caused by many different types of germs, including viruses (most common) and bacteria.

Usually, the germs are passed from one person to another. If you touch something that has germs on it, the germs can get in your mouth, nose, or throat. Usually, your body fights off the germs. But sometimes the germs get in your lungs and cause an infection.

Pneumonia is treated antibiotics that work best for the type of germ that's causing the problem (but not all germs that cause pneumonia can be killed by antibiotics) Medicines to help with fever or pain and Sometimes extra fluids or oxygen. By definition, pneumonia is an inflammation of the lung tissue.

Cystic fibrosis is caused by inherited genetic variants that cause thick, sticky secretions to clog the lungs and other organs. Typical symptoms include abdominal bloating, loose stools, and poor weight gain as well as coughing, wheezing, and frequent respiratory tract infections throughout life. The diagnosis is based on sweat test results and/or genetic testing. About half of the people with this disease in the United States are adults.

Treatments include antibiotics, bronchodilators, drugs to thin lung secretions, airway clearance treatments for respiratory problems, supplements of pancreatic enzymes and vitamins for digestive problems, and drugs to improve the function of the cystic fibrosis protein in people with certain genetic variants. Some people benefit from liver and lung transplantation.

Cystic fibrosis is the most common inherited disease leading to a shortened life span among white people. In the United States, it occurs in about 1 of 3,300 white infants and in 1 of 15,300 black infants. It is rare in Asians. Because improvements in treatment have extended life expectancy for people with cystic fibrosis, about half of the people in the United States with this disease are adults. Cystic fibrosis is equally common among boys and girls.

Cystic fibrosis results when a person inherits two defective copies (variants) of a particular gene, one from each parent. This gene is called the cystic fibrosis transmembrane conductance regulator (CFTR). There are a number of variants of the CFTR gene. For example, the most common one is called the F508del variant. The CFTR gene controls the production of a protein that regulates the movement of chloride, bicarbonate, and sodium (salt) across cell membranes. Variants of the CFTR gene cause the protein to become dysfunctional. If the protein does not work correctly, the movement of chloride, bicarbonate, and sodium is disrupted, leading to thickening and increased stickiness of secretions throughout the body.

Worldwide, about 3 of 100 white people carry one defective copy of the CFTR gene. People with one defective copy are carriers but they themselves do not get sick. About 3 of 10,000 white people inherit two defective copies of the gene and develop cystic fibrosis.

Cystic fibrosis affects many organs throughout the body and nearly all the glands that secrete fluids into a duct (exocrine glands).

The organs most commonly affected are the Lungs, Pancreas, Intestines, Liver and gallbladder, and Reproductive organs.

The lungs are normal at birth, but problems can develop at any time afterward as thick secretions begin to block the small airways (mucus plugging). The plugging leads to chronic bacterial infections and, the always present, inflammation that cause permanent damage to the airways (bronchiectasis). These problems make breathing increasingly difficult and reduce the lungs' ability to transfer oxygen to the blood. People also may have frequent bacterial respiratory infections that affect the sinuses.

In the pancreas, blockage of ducts prevents digestive enzymes from reaching the intestine. A lack of these enzymes leads to poor absorption of fats, proteins, and vitamins (malabsorption). This poor absorption, in turn, can lead to nutritional deficiencies and poor growth. Eventually, the pancreas can become scarred and no longer produce enough insulin, so some people develop diabetes. However, about 5 to 15% of people who have cystic fibrosis and carry certain variants do not develop pancreatic digestive problems.

The intestines can become blocked by thick secretions. This blockage is common immediately after birth because the contents of the fetus's digestive tract (called meconium) are abnormally thick. Such blockage in the small intestine is called meconium ileus and in the large intestine is called meconium plug syndrome. Older children and adults may also have problems with constipation and blockage of the intestines (distal intestinal obstruction syndrome).

The liver and gallbladder can be blocked by thick secretions, which eventually can cause liver scarring (fibrosis). Gallstones may develop.

The reproductive organs can be blocked by thick secretions, which can cause infertility. Almost all men are infertile, but infertility is much less common in women.

The sweat glands secrete fluid containing more salt than normal, increasing the risk of dehydration.

About 10% of newborns who have cystic fibrosis have meconium ileus, which causes vomiting, bloating (distention) of the abdomen, and absence of bowel movements. Meconium ileus is sometimes complicated by perforation of the intestine, a dangerous condition causing infection and peritonitis (inflammation of the tissue lining the abdominal cavity and abdominal organs) and, if untreated, shock and death. Some newborns have a twisting of the intestine on itself (volvulus) or incomplete development of the intestine. Newborns who have meconium ileus almost always develop other symptoms of cystic fibrosis.

The first symptom of cystic fibrosis in an infant who does not have meconium ileus is often a delay in regaining birth weight or poor weight gain at 4 to 6 weeks of age. This poor weight gain is due to poor absorption of nutrients related to inadequate amounts of pancreatic enzymes. The infant has frequent, bulky, foul-smelling, oily stools and may have a bloated (distended) abdomen. Without treatment, weight gain in infants and older children is slow despite a normal or large appetite.

Inadequate absorption of the fat-soluble vitamins A, D, E, and K may lead to night blindness, osteopenia (decrease in bone density), osteoporosis, anemia, and bleeding disorders.

In untreated infants and toddlers, the lining of the rectum may protrude through the anus, a condition called rectal prolapse. Infrequently, infants with cystic fibrosis who have been fed soy formula or hypoallergenic formula may develop anemia and swelling of the extremities, because they are not absorbing enough protein.

Complications of cystic fibrosis in adolescents and adults include rupture of the small air sacs of the lung (alveoli) into the pleural space (the space between the lung and chest wall). This rupture can allow air to enter into the pleural space (pneumothorax), which collapses the lung. Other complications include pulmonary hypertension leading to heart failure and massive or recurring bleeding in the airways.

About 2% of children, 20% of adolescents, and up to 50% of adults with cystic fibrosis develop insulin-dependent diabetes because the scarred pancreas can no longer produce enough insulin.

The blockage of bile ducts by thick secretions can lead to inflammation and eventually scarring of the liver (cirrhosis) in about 3 to 4% of people with cystic fibrosis. Cirrhosis may increase the pressure in the veins entering the liver (portal hypertension), leading to enlarged, fragile veins at the lower end of the esophagus (esophageal varices), which can rupture and bleed profusely.

In almost all people with cystic fibrosis, the gallbladder is small, filled with thick bile, and does not function well. About 10% of people develop gallstones, but only a small percentage develops symptoms. Surgical removal of the gallbladder is rarely needed.

People with cystic fibrosis often have impaired reproductive function. Almost all men have a low or absent sperm count (which makes them sterile) because one of the ducts of the testis (the vas deferens) has developed abnormally and blocks the passage of sperm. In women, cervical secretions are too thick, causing somewhat decreased fertility. However, many women with cystic fibrosis have carried pregnancies to term. The outcome of the pregnancy for both the mother and the newborn is related to the mother's health status during pregnancy. Otherwise, sexual function is not impaired in men or women.

Other complications may include arthritis, chronic pain, problems sleeping and obstructive sleep apnea, kidney stones, kidney disease, depression and anxiety, sensorineural hearing loss and ear ringing (tinnitus) caused by exposure to drugs that damage the ears (especially aminoglycosides), and an increased risk of cancer of the bile ducts, pancreas, and intestines.

The treatment of lungs are focused on preventing airway blockage and controlling infection.

The person should receive all routine immunizations, particularly for infections that can cause respiratory problems such as *Haemophilus influenzae*, influenza, measles, pertussis, pneumococcus, and varicella. COVID-19 vaccination should be received based on current recommendations from the Centers for Disease Control and Prevention (CDC).

Airway clearance techniques, which include postural drainage, chest percussion, hand vibration over the chest wall, and encouragement of coughing (see Chest Physical Therapy), are started when cystic fibrosis is first diagnosed. Parents of a young child can learn these techniques and carry them out at home every day. Older children and adults can carry out airway clearance techniques independently by using special breathing devices, an inflatable vest that vibrates at a high frequency (a high-frequency oscillation vest), or special breathing maneuvers. Aerobic exercise, done regularly, can also help keep the airways clear.

Bronchodilators are drugs that help prevent the airways from narrowing. People usually take bronchodilators by inhaling them. People with severe lung problems and a low level of oxygen in the blood may need supplemental oxygen therapy. In general, people with chronic respiratory failure do not benefit from using a ventilator (breathing machine). However, occasional, short periods of mechanical ventilation in the hospital may help during an acute infection, after a surgical procedure, or while waiting for a lung transplant.

Drugs that help thin the thick mucus in the airways, such as dornase alfa or hypertonic saline (a highly concentrated salt solution), are widely used. These drugs are inhaled through a nebulizer. They make it easier to cough up sputum, improve lung function, and may also decrease the frequency of serious respiratory tract infections.

Corticosteroids, such as prednisone or dexamethasone, given by mouth can relieve symptoms in infants with severe bronchial inflammation, in people who have narrowed airways that cannot be opened with bronchodilators, and in people who have an allergic lung reaction to a type of fungus (allergic bronchopulmonary aspergillosis). Allergic bronchopulmonary aspergillosis is also treated with an antifungal drug given by mouth, by vein, or both.

Ibuprofen, a nonsteroidal anti-inflammatory drug (NSAID), is sometimes used to slow the deterioration of lung function.

Drugs to treat chronic inflammation of the sinuses (sinusitis) are needed because this problem is very common. Treatment options include flushing a saltwater solution through the nose (nasal saline irrigation), inhaling dornase alfa into the nose using a nebulizer, and irrigating the nose and sinuses with antibiotics. A corticosteroid nasal spray is recommended to treat inflammation and swelling of the mucous membranes of the nose (allergic rhinitis).

Pulmonary edema is acute, severe left ventricular failure with pulmonary venous hypertension and alveolar flooding. Findings are severe dyspnea, diaphoresis, wheezing, and sometimes blood-tinged frothy sputum. Diagnosis is clinical and by chest x-ray. Treatment is with oxygen, IV nitrates, diuretics, and sometimes morphine and, in patients with heart failure and reduced ejection fraction short-term IV positive inotropes, and assisted ventilation (i.e., endotracheal intubation with mechanical ventilation or bilevel positive airway pressure ventilation).

Initial treatment includes identifying the cause; 100% oxygen by nonrebreather mask; upright position; furosemide 0.5 to 1.0 mg/kg IV or by continuous infusion 5 to 10 mg/hour; nitroglycerin 0.4 mg sublingually every 5 minutes, followed by an IV drip at 10 to 20 mcg/minute, titrated upward at 10 mcg/minute every 5 minutes as needed to a maximum 300 mcg/minute if systolic BP is >100 mm Hg. Morphine, 1 to 5 mg IV once or twice, has long been used to reduce severe anxiety and the work of breathing but is decreasingly used (except in palliative care) due to observational studies suggesting a poorer outcome with its use. Noninvasive ventilatory assistance with bilevel positive airway pressure (BiPAP) is helpful if hypoxia is significant. If carbon dioxide retention is present or the patient is obtunded, tracheal intubation and mechanical ventilation are required.

Specific additional treatment depends on etiology.

In patients with acute MI, fluid status before onset of pulmonary edema is usually normal, so diuretics are less useful than in patients with acute decompensation of chronic heart failure and may precipitate hypotension. If systolic BP falls <100 mm Hg or shock develops, IV dobutamine and an intra-aortic balloon pump (counter pulsation) may be required.

Some newer drugs, such as IV BNP (nesiritide), and calcium-sensitizing inotropic drugs (levosimendan, pimobendan), vesnarinone, and ibopamine, may have initial beneficial effects but do not appear to improve outcomes compared to standard therapy, and mortality may be increased. Serelaxin, a recombinant form of the human pregnancy hormone relaxin-2, has been tried but benefits were not shown in a large international randomized study. Omecamtiv mecarbil, an oral cardiac myosin activator, is being evaluated for ability to reduce morbidity and mortality in patients currently or recently hospitalized with decompensated heart failure.

Sarcoidosis is an inflammatory disorder resulting in non-caseating granulomas in one or more organs and tissues; etiology is unknown. The lungs and lymphatic system are most often affected, but sarcoidosis may affect any organ. Pulmonary symptoms range from none to cough, exertional dyspnea and, rarely, hemoptysis, aspergillus fungus-infected lung cysts, lung or other organ failure. Diagnosis usually is first suspected because of pulmonary involvement and is confirmed by chest x-ray, biopsy, and exclusion of other causes of granulomatous inflammation. First-line treatment is corticosteroids. Prognosis is excellent for limited disease but poor for progressive and advanced disease.

Sarcoidosis most commonly affects people aged 20 to 40 but occasionally affects children and older adults. Worldwide, prevalence is greatest in black Americans and ethnic northern Europeans, especially Scandinavians. Disease presentation varies widely by racial and ethnic background, with black Americans having more frequent extrathoracic manifestations. Sarcoidosis is more prevalent in women.

Sarcoidosis is thought to be due to an inflammatory response to an environmental antigen in a genetically susceptible person. Proposed triggers include:

Propionibacterium acnes and mycobacteria (potentially the Mycobacterium tuberculosis catalase-peroxidase (mKatG) protein), mold or mildew and certain unidentified substances present in workplaces with musty odors. and pesticides, particularly those containing aluminum compounds.

Tobacco use is inversely correlated with sarcoidosis.

Evidence supporting genetic susceptibility includes the following:

Higher rate of disease concordance in monozygotic than dizygotic twins

Increased prevalence of sarcoidosis (about 3.6 to 9.6%) among 1st- or 2nd-degree relatives of patients who have sarcoidosis Fivefold increase in relative risk of developing sarcoidosis in siblings of patients who have sarcoidosis Identification of several possible human leukocyte antigen (HLA) and non-HLA genes associated with sarcoidosis The unknown antigen triggers a cell-mediated immune response that is characterized by the accumulation of T cells and macrophages, release of cytokines and chemokines, and organization of responding cells into granulomas. Clusters of disease in families and communities suggest a genetic predisposition, shared exposures, or less likely, person-to-person transmission.

The inflammatory process leads to formation of noncaseating granulomas, the pathologic hallmark of sarcoidosis. Granulomas are collections of mononuclear cells and macrophages that differentiate into epithelioid and multinucleated giant cells and are surrounded by lymphocytes, plasma cells, fibroblasts, and collagen. Granulomas occur most commonly in the lungs and lymph nodes but can involve any organ and cause significant dysfunction. Granulomas in the lungs are distributed along lymphatics, with most occurring in peribronchiolar, subpleural, and perilobular regions. Granuloma accumulation distorts architecture in affected organs. Whether granulomas lead directly to fibrosis or run a parallel course is not known.

Hypercalcemia may occur because of increased conversion of vitamin D to the activated form (1,25 hydroxy vitamin D) by macrophages. Hypercalciuria may be present, even in patients with normal serum calcium levels. Nephrolithiasis and nephrocalcinosis may occur, sometimes leading to chronic kidney disease.

Symptom management of Sarcoidosis begins with corticosteroids. The presence of chest imagining abnormalities without significant symptoms or evidence of decline in organ function is not an indication for treatment. A standard protocol is prednisone 20 mg to 40 mg by mouth once a day, depending on symptoms and severity of findings. Alternate-day regimens may be used: eg, prednisone 40 mg by mouth once every other day. Although patients rarely require >40 mg/day, higher doses may be needed to reduce complications in neurologic disease. Response usually occurs within 6 to 12 weeks, so symptoms and pulmonary function test results may be reassessed between 6 and 12 weeks. Chronic, insidious cases may respond more slowly. Corticosteroids are tapered to a maintenance dose (e.g., prednisone 10 to 15 mg/day) after evidence of response and are continued for an additional 6 to 9 months if improvement occurs.

The optimal duration of treatment is unknown. Premature taper can result in relapse. The drug is slowly stopped if response is absent or equivocal. Corticosteroids can ultimately be stopped in most patients, but because relapse occurs up to 50% of the time, monitoring should be repeated, usually every 3 to 6 months. Corticosteroid treatment should be resumed for recurrence of symptoms and signs. Because angiotensin-converting enzyme (ACE) production is suppressed with low doses of corticosteroids, serial serum ACE levels may be useful in assessing adherence with corticosteroid treatment in patients who have elevated ACE levels.

Inhaled corticosteroids can relieve cough in patients with endobronchial involvement or with hyperreactive airways.

Topical corticosteroids may be useful in dermatologic, nasal sinus, and ocular disease.

Prophylaxis against *Pneumocystis jirovecii* pneumonia should be considered while patients are taking >20 mg prednisone daily or its equivalent for more than a month and for those who are taking immunosuppressants. Sarcoidosis patients should be screened (echocardiogram) for pulmonary hypertension.

Alendronate or another bisphosphonate may be the treatment of choice for prevention of corticosteroid-induced osteoporosis. Using supplemental calcium or vitamin D risks hypercalcemia due to endogenous production of active vitamin D (1, 25 dihydroxy vitamin D) by sarcoidal granulomas. Serum and 24-hour urinary calcium measurements should be normal before starting such supplements.

Idiopathic pulmonary fibrosis (IPF) due to idiopathic interstitial pneumonia, causes progressive pulmonary fibrosis. Symptoms and signs develop over months to years and include exertional dyspnea, cough, and fine (Velcro) crackles. Diagnosis is based on history, physical examination, high-resolution CT, and/or lung biopsy, if necessary. Treatment may include antifibrotic drugs and oxygen therapy. Most patients deteriorate; median survival is about 3 years from diagnosis.

A combination of environmental, genetic, and other unknown factors probably contributes to alveolar epithelial cell dysfunction or reprogramming, which leads to abnormal fibroproliferation in the lung. There is ongoing research into the contributions of genetics, environmental stimuli, inflammatory cells, the alveolar epithelium, mesenchyme, and matrix.

The key histologic findings of idiopathic pulmonary fibrosis are subpleural fibrosis with sites of fibroblast proliferation (myofibroblast foci) and dense scarring, alternating with areas of normal lung tissue (heterogeneity). Scattered interstitial inflammation occurs with lymphocyte, plasma cell, and histiocyte infiltration. Cystic abnormality (honeycombing) occurs in all patients and increases with advanced disease, as does traction bronchiectasis. A similar histologic pattern uncommonly occurs in cases of interstitial lung diseases of known etiology.

Treatment of IPF includes Pirfenidone or nintedanib, Oxygen and pulmonary rehabilitation and Sometimes lung transplantation.

Pirfenidone and nintedanib are antifibrotic drugs that slow progression of idiopathic pulmonary fibrosis (1-3). Supportive measures include oxygen and pulmonary rehabilitation. Approximately 30% of IPF patients develop severe pulmonary hypertension. Inhaled Treprostinil (a prostacyclin analogue) powder is presently being evaluated for treatment of IPF patients that have PH. Patients may find that joining a support group helps reduce the stress of the illness.

Pulmonary Arterial Hypertension (PAH). PAH develops in susceptible individuals—that may have a genetic predisposition—after injury to the lining cells of the small lung resistance vessels. These endothelial cells die (undergo apoptosis), and this cell death is then followed by exuberant, lumen-occluding cell growth. These lumen-occluding cells are abnormal in that they are apoptosis-resistant. There are several candidate proteins (growth factors and their receptors) that are likely involved in complex cell-cell interactions that have been summarized as "wound healing gone awry". The greater the number of occluded small resistance vessels, the higher the resistance to lung vessel blood flow. As this patho-biological concept is gaining wide acceptance, investigators are examining non-vasodilator treatment strategies.

Lung vascular lesions in established PAH are complex, and there are many avenues that in different patients can lead to the development of pulmonary hypertension (PH). In addition to the idiopathic forms of PAH (IPAH), which include heritable PAH due a small number of known gene mutations, (most frequently mutations of the BMPR2 gene), there is severe PAH associated with congenital heart defects, associated with interstitial lung diseases, collagen-vascular diseases, HIV/AIDS, schistosomiasis infection chronic liver disease and COPD. In all of these forms of PH, and also the rare form of pulmonary veno-occlusive disease, the pathological changes of the lung vessels are severe. In addition to a genetic- or otherwise-predisposition a second factor or several additional factors are needed for severe PAH to develop. This is illustrated by the fact that for any known PH risk factor there is only a small number of people that actually develop severe PH. These second factors can be drugs, cigarette smoke toxins (including heavy metals), viral infections, immune system abnormalities, including antibodies directed against the lung vascular cells.

Acute respiratory distress syndrome (ARDS) is a type of respiratory lung failure resulting from many different disorders that cause fluid to accumulate in the lungs and oxygen levels in the blood to be too low. The person suffering from ARDS has shortness of breath, usually with rapid, shallow breathing, the skin may become mottled or blue (cyanosis), and other organs such as the heart and brain may malfunction.

A pulse oximetry or a sample of blood from an artery is used to determine the levels of oxygen in the blood, and a chest x-ray is also taken.

People are treated in an intensive care unit because they may need mechanical ventilation.

Oxygen is given and the cause of the respiratory failure, if known, is treated.

Acute respiratory distress syndrome (ARDS) is a medical emergency. It may occur in people who already have lung disease or in those with previously normal lungs. This disorder used to be called adult respiratory distress syndrome, although it can occur in children.

ARDS is divided into three categories: mild, moderate, and severe. The category is determined by comparing the level of oxygen in the blood with the amount of oxygen that needs to be given to achieve that level.

Any disease or condition that injures the lungs can cause ARDS. More than half of the people with ARDS develop it as a consequence of a severe, widespread infection (sepsis) or pneumonia. Some other causes include: aspiration (inhalation) of acidic stomach contents into the lungs, burns, certain complications of pregnancy (such as amniotic fluid embolism, preeclampsia, infection of tissues in the uterus before, during, or after a miscarriage (septic abortion), and others), chest injury (pulmonary contusion), coronary artery bypass surgery, drowning, inflammation of the pancreas (pancreatitis), inhalation of large amounts of smoke, inhalation of other toxic gas, injury to the lungs due to inhaling high concentrations of oxygen, life-threatening or severe injuries, overdose of certain drugs, such as heroin, methadone, propoxyphene, or aspirin, pneumonia (including from COVID-19), prolonged or severe low blood pressure (shock), pulmonary embolism, severe, widespread infection (sepsis), stroke or seizure, and transfusions of more than about 15 units of blood in a short period of time (transfusion related acute lung injury (TRALI), is caused by damaged red blood cells or activated platelets).

When the small air sacs (alveoli) and tiny blood vessels (capillaries) of the lungs are injured, blood and fluid leak into the spaces between the air sacs and eventually into the sacs themselves. Collapse of many alveoli (a condition called atelectasis) may also result because of a reduction in surfactant, a liquid that coats the inside surface of the alveoli and helps to keep them open. Fluid in the alveoli and the collapse of many alveoli interfere with the movement of oxygen from inhaled air into the blood. Thus, the level of oxygen in the blood decreases sharply. Movement of carbon dioxide from the blood to air that is exhaled is affected less, and the level of carbon dioxide in the blood increases in the most severe cases. Because respiratory failure in ARDS results mainly from low levels of oxygen, it is considered hypoxemic respiratory failure.

Without prompt supportive treatment, people who have ARDS will not survive.

People who respond promptly to treatment usually recover completely with few long-term lung abnormalities. Those whose treatment involves long periods on a ventilator (a machine that helps air get in and out of the lungs) are more likely to develop lung scarring (ventilator-induced lung injury). Such scarring may decrease over a few months after the person is taken off the ventilator. Lung scarring, if extensive, can impair lung function permanently in ways that are noticeable during certain day-to-day activities. Less extensive scarring may impair lung function only when the lungs are stressed, such as during exercise or an illness.

Many people lose large amounts of weight and muscle during the illness. Rehabilitation in the hospital can help them regain their strength and independence.

Treatment includes, treatment of the cause, Oxygen therapy, most often mechanical ventilation People with ARDS are treated in an intensive care unit (ICU).

Successful treatment usually depends on treating the underlying disorder (for example, pneumonia). Oxygen therapy, which is vital to correcting low oxygen levels, also is provided.

If oxygen delivered by a face mask or nasal prongs does not correct the low blood oxygen levels, or if very high doses of inhaled oxygen are required, mechanical ventilation must be used. Usually a ventilator delivers oxygen-rich air under pressure using a tube inserted through the mouth into the windpipe (trachea).

SUMMARY

The present inventors have discovered that high levels of extracellular and intracellular copper play a critically important role in the pathogenesis of severe PH and PAH, as well as, Interstitial Lung Disease, Sarcoidosis, and Idiopathic Pulmonary Fibrosis, all of which can be treated by modifying the influence of copper on lung vascular cell growth, vascular inflammation, and angiogenesis by copper chelation. Specifically, some exemplary embodiments concern treating a patient suffering from severe PH and PAH as well as Interstitial Lung Disease, Sarcoidosis, and Idiopathic Pulmonary Fibrosis by the administration of a therapeutically effective amount of a copper chelator comprising a tetrathiomolybdate $[(MoS_4)^{-2}]$ salt, hereinafter TTM salt.

The present inventors also discovered that the treatment of severe PH and PAH, in addition to Interstitial Lung Disease, Sarcoidosis, and Idiopathic Pulmonary Fibrosis, may be further enhanced by the combination of the copper chelator comprising the TTM salt and at least one active agent selected from, inhibitors of the 5-lipoxygenase enzyme (5-LO), such as diethylcarbamazine (or salts thereof, such as diethylcarbamazine citrate) and zileuton, rituximab, baicalin, inhibitors of immune checkpoints CTLA-4, PD-1 and PDL-1, such as NKTR 214 and NKTR 358, bufalin, quercetin, curcumin, integrin inhibitors, inhibitors of NF-kappaB, such as Apigenin and indole-3-carbinol, and focal adhesion kinase inhibitors such as disulfiram, fucoxanthinol, and nintedanib. The copper chelator comprising the TTM salt and at least one active agent may be administered separately. For example, the copper chelator comprising the TTM salt may be administered orally as a pill, such as an enteric coated pill, or intravenously as an injectable, and the at least one active agent may be administered intravenously or orally.

The inventors have discovered that the treatment of severe PH, PAH as well as Asthma, Pneumonia, Bronchitis, Cystic Fibrosis, Pulmonary Edema, Interstitial Lung Disease, Sarcoidosis, and Idiopathic Pulmonary Fibrosis may be enhanced by adding an inhaler containing Beraprost and diethylcarbamazine (or salts thereof, such as diethylcarbamazine citrate) or Beraprost, diethylcarbamazine (or salts thereof, such as diethylcarbamazine citrate) and Fluvoxamine to the therapy comprising the TTM salt and at least one active agent selected from, inhibitors of the 5-lipoxygenase enzyme (5-LO), such as diethylcarbamazine (or salts thereof, such as diethylcarbamazine citrate) and zileuton, rituximab, baicalin, inhibitors of immune checkpoints CTLA-4, PD-1 and PDL-1, such as NKTR 214 and NKTR 358, bufalin, quercetin, curcumin, integrin inhibitors, inhibitors of NF-kappaB, such as Apigenin and indole-3-carbinol, and focal adhesion kinase inhibitors such as disulfiram, fucoxanthinol, and nintedanib.

The BERADEC™ inhaler (an inhaler for the administering the combination of Beraprost and diethylcarbamazine, or salts thereof, such as diethylcarbamazine citrate) is indicated for the treatment of most, if not all forms of PAH and Asthma, Pneumonia, Bronchitis, Cystic Fibrosis, Pulmonary Edema, Interstitial Lung Disease, Sarcoidosis, and Idiopathic Pulmonary Fibrosis. The direct targeting the lung tissue approach achieved by inhaling these drugs will provide a pulmonary vasodilator, Beraprost, that also has anti-inflammatory and anti-fibrotic activities and diethylcarbamazine (or salts thereof, such as diethylcarbamazine citrate), which inhibits the production of the injurious leukotrienes LTC4 and LTB4, which are broncho- and vasoconstrictors (LTC4) and attract neutrophils into the lung and injure the lung vascular endothelial cells (LTB4). All forms of pulmonary hypertension are characterized by intra- and perivascular inflammation which are not treated (prevented) by endothelin receptor blockers or phosphodiesterase inhibitors which are first line drugs to treat severe PAH. Because up to 30% of COPD patients have PH, BERADEC™ provides a novel strategy to treat PH in COPD patients, in particular because the key enzyme involved in the synthesis of leukotrienes, 5-lipoxygenase, is highly expressed in the lung tissue of patients with severe PAH. Studies have also documented that leukotrienes are present in the breath exhalate from COPD patients. The treatment of the pulmonary hypertension component of the COPD syndrome has recently been recognized as an unmet need. The inhaler can be used alone or in combination with orally administered diethylcarbamazine (or salts thereof, such as diethylcarbamazine citrate)—the latter to achieve high plasma drug levels. This goal—to achieve high plasma drug levels may be pursued in cases where there is evidence for systemic inflammation (high plasma levels of CRP, IL-1, IL-6, TNF alpha).

Acute Respiratory Distress Syndrome (ARDS) can be treated by this invention.

ARDS is caused by infections (sepsis), trauma, aspiration of gastric content, blood transfusions, and COVID 19.

Common to heart and lung failure syndromes developed by COVID-19 is the inflamed endothelium (the endothelium can be considered an organ and it is noteworthy that the largest number of endothelial cells anywhere in the body is in the lungs) that becomes the staging ground for multi cell type conglomerates that clog vessels and capillaries (not just macrophages, but also platelets, neutrophils and red blood cells form these conglomerates). We define the pathobiologically critical mechanism of "intra-vascular inflammation" as the formation of multi-cellular aggregates adhering to inflamed endothelial cells.

A human study examined the bronchoalveolar lavage fluid (BALF) from COVID-19-infected patients with severe lung injury and reported the presence of multiple inflammatory cells, many of bone marrow origin, like myeloid dendritic cells, mast cells, plasma cells and T—lymphocytes. The authors describe a highly pro-inflammatory macrophage microenvironment and the presence of both M1 and M2 macrophages that express NF-kappaB and STAT 1 and STAT2.

In the context of intravascular inflammation, the production of reactive oxygen species is to be expected and their cell-injurious potential is appreciated. While it remains presently unresolved whether COVID-19—related lung damage is a special form of ARDS, there can be no doubt that inflammation, including intravascular inflammation is instrumental in causing organ damage and the demise of patients, is similar if not identical to ARDS.

The corona virus infection (COVID-19) can become lethal because of inflammatory organ damage: in the lung leading to diffuse alveolar damage (DAD) and thrombotic vascular occlusion and ARDS, and in the heart, another organ that is attacked, via myocarditis and heart muscle damage. There is a consensus that the inflammatory response triggered by the COVID-19 determines the outcome.

In general terms, the present invention is based on learning that fatal events from a Corona Virus that lead to ARDS can be prevented by drugs that interfere with intra-vascular inflammation. The intravascular events tie together lung and heart failure. Briefly, the "sick lung circulation" releases a myriad of mediators that enter the next proximate circulation: the coronary circulation. The "bad humor" released by the sick lung circulation spills over into the systemic circulation and also reaches the central nervous system. The overall concept is that the injured lung—in particular the lung vessels—emits signals of cell damage; these signals include chemotactic factors such as chemokines and leukotrienes, cell fragments and free DNA.

The BERADEC™ inhaler will be useful during the early stage COVID 19 and the onset of ARDS, but also during later stages of ARDS. As in PAH, the treatment concept is to interfere with the process of intravascular inflammation and its micro-thrombotic consequences. Prostacyclin (in this case Beraprost) is anti-inflammatory and has antithrombotic activity; it has also antifibrotic effects. This is important because fibrosis of the lung follows the acute inflammatory phase of ARDS. Chemotaxis (attraction of inflammatory cells, in particular neutrophils and macrophages into the injured lung) is a mechanism that amplifies the pulmonary inflammation and injury. Leukotriene B4 is a powerful chemoattractant and its synthesis is inhibited by the diethylcarbamazine (or salts thereof, such as diethylcarbamazine citrate) component of the inhaler. Diethylcarbamazine (or salts thereof, such as diethylcarbamazine citrate) also inhibits the activity of the master transcription factor NFkappaB, which is responsible for the transcription of a large number of inflammatory mediators, (for example: LTB4 via NFkappaB causes an increase in the production of IL1 and IL-6). BERADEC™ can be administered through the endotracheal tube of ventilated patients in order to deliver the drug combination directly into the lung—without worsening ventilation/perfusion—which would occur if the prostacyclin would be administered systemically. In order to reach high plasma levels DEC can be additionally administered orally (via a nasogastric feeding tube) or infused intravenously. Ideally, the inhaler would be used in a pre-ARDS setting in the emergency department or in the intensive care unit. We define "pre-ARDS" as the as the condition of a patient at high risk of developing acute lung injury, for example a patient with septic shock or a patient that has aspirated gastric contents or a patient receiving mass transfusions after a severe trauma. The treatment of a patient with manifest ARDS both using the inhalational and the systemic route is not redundant as this strategy aims at the treatment of the lung and the systemic inflammation.

This invention is based in part on discovering that Diethylcarbamazine (or a salt thereof, such as diethylcarbamazine citrate), a drug that has been used for years in the treatment of certain parasitic diseases caused by infection with roundworms of the Filarioidea type, including lymphatic filariasis caused by infection with *Wuchereria bancrofti, Brugia malayi*, or *Brugia timori*; tropical pulmonary eosinophilia; and loiasis has mechanisms of action that will be very effective in treating COPD ARDS, PAH, Asthma, Pneumonia, Bronchitis, Cystic Fibrosis, Pulmonary Edema, Interstitial Lung Disease, Sarcoidosis, Idiopathic Pulmonary Fibrosis and other lung diseases.

Hereinafter, for the purposes of the invention, "DEC" is used to encompass Diethylcarbamazine ($C_{10}H_{21}N_3O$) and the salts thereof, such as Diethylcarbamazine Citrate, ($C_{10}H_{21}N_3O \cdot C_6H_8O_7$ or $C_{16}H_{29}N_3O_8$), unless otherwise stated.

This invention is based in part on discovering that Beraprost, or Iloprost, or other vasodilators, drugs that have been used to treat Pulmonary Arterial Hypertension, will also provide benefits in treating COPD, asthma, Interstitial Lung Disease, acute respiratory distress syndrome, pneumonia, bronchitis, cystic fibrosis, pulmonary edema, sarcoidosis, Idiopathic Pulmonary Fibrosis and PAH and work synergistically with DEC.

This invention is also based on the fact that inhaled DEC is effective when used as treatment with or without a co-drug vasodilator, such as Beraprost or other Prostacyclin Analogue vasodilators, can be also be combined with an inhalable PDE4 inhibitor, for example CHF6001 ([(1S)-1-[3-(cyclopropylmethoxy)-4-(difluoromethoxy)phenyl]-2-(3,5-dichloro-1-oxidopyridin-1-ium-4-yl)ethyl] 3-(cyclopropylmethoxy)-4-(methanesulfonamido) benzoate, or $C_{30}H_{30}C_{12}F_2N_2O_8S$), which was developed by Chiesi Pharma (Lee J H, Kim H J, Lung 20015). In the case of PDE4 inhibitor CHF6001, a small study showed CHF6001 on its own to have some anti-inflammatory effects, but together with DEC or DEC plus a Prostacyclin Analogue vasodilator, such as Beraprost or Iloprost, should be more effective in a number of COPD endotypes.

This invention is based in part on discovering that inhaled DEC is effective when used as treatment with or without a co-drug vasodilator, such as Beraprost or other Prostacyclin Analogues vasodilators, can also be combined with (SSRIs) such as Fluvoxamine that on its own has some anti-inflammatory effects, but together with DEC or DEC plus a vasodilator, such as Beraprost or Iloprost, could be more effective in a number of COPD endotypes.

The antidepressant fluvoxamine has been shown to reduce inflammation via stimulation of the Sigma-1 receptor and the inventors has discovered that the mechanism of action is different from Prostacyclin Analogues vasodilators or DEC and is additive to the effect of reducing inflammation.

FIG. 2 in part illustrates some of the disease components (like chemotaxis and vasoconstriction) that are being targeted by DEC and Beraprost leading to disease modification. FIG. 6 is a comparison of the current treatment mechanisms of action to the proposed treatment mechanisms of action.

In general terms, the present invention is based on discovering that progression of the disease can be prevented and the number of COPD exacerbations can be reduced and pulmonary hypertension in COPD patients can be treated with a two drug combination whereby the First Drug, DEC, provides multiple benefits that include (1) inhibition of the synthesis of the leukotrienes LTB4 and LTC4 which are mediators of inflammation addressing (a) bronchospasm and (b) pulmonary vascular constriction (2) inhibition of the synthesis of the highly chemotactic LTB4 addressing Inhibition of chemotaxis of inflammatory cells into the lung, protection against endothelial cell damage (apoptosis) and inhibition of airway edema (3) antiviral benefits by reducing viral loads following infection and allows body to generate antibodies against viruses helping patients to fight off seasonal viral infections (and *Haemophilus influenzae* infections) that cause COPD exacerbations (4) anti-oxidant properties that protect against lung tissue damage (5) offers anti-fibrotic action that protects against lung tissue scar formation and is an inhibitor of 5 Lipoxygenase, that when inhibited, is expected to block or limit the non-enzymatic function of binding to NFkappaB, that activates the gene transcription of inflammatory mediators like IL-1, IL-6 and TNF-alpha that results in persistence of the smoldering chronic inflammation. The Second Drug, which can be a vasodilator such as Beraprost or Iloprost, are both anti-inflammatory vasodilators that are also anti-fibrotic and replace prostacyclin (the production of prostacyclin is reduced in emphysematous lungs). Loss of prostacyclin creates a loss of protection to endothelial cells and the vessels turn into a thrombogenic surface, and therefore adding prostacyclin will provide the benefit of antithrombotic, anti-fibrotic and inhibition of inflammation. By supplementing the lost prostacyclin, the endothelial cells remain protected. Beraprost or Iloprost may also improve gas exchange. Other vasodilators that can be used instead of Beraprost or Iloprost include Treprostinil, Treprostinil Palmitil or Cicaprost. The third drug that may or may not be added to Beraprost and DEC, fluvoxamine, reduces inflammation via stimulation of the Sigma-1 receptor.

Exacerbations that require hospitalization are a bad prognostic marker. It has been estimated that up to 20% of the acute exacerbations are not caused by worsening airway disease or pneumonia, but by thromboemboli. Today, most patients with an acute exacerbation move from the Emergency Room to the CT scanner to rule out pulmonary emboli. One of the benefits of a treatment that includes a prostacyclin as is supplied by both Beraprost or Iloprost or other vasodilators is that they should reduce or prevent pulmonary thrombus formation.

The vasodilator also provides the benefit of an anti-inflammatory action. This anti-inflammatory action can be synergistic with the anti-inflammatory effect of DEC and preserve lung vascular endothelial cell function.

Specifically, the present invention is based first on the understanding that in COPD there is a chronic smoldering inflammation leading to the slow destruction of the lungs with loss of lung tissue, damaged airways and lung vessels accounting for the diminished lung function and exercise intolerance.

With this understanding, the novel approach is to combine DEC that will (1) reduce inflammation with a multi-step approach of inhibiting key inflammatory mediators thereby protecting the endothelial cells and airways against damage, inhibiting airway edema, reducing bronchospasm and pulmonary vascular constriction and block gene transcription of inflammatory mediators (2) provide for antiviral benefits and reduce COPD exacerbations (3) offer ant-oxidant properties and anti-fibrotic actions that protect against scar formation in a drug combination with a second drug that is an antifibrotic vasodilator that increases the effectiveness of drug efficacy and provide prostacyclin that will provide the benefit of antithrombotic, anti-fibrotic and inhibition of inflammation.

The specific hypothesis is that DEC together with either Beraprost ($C_{24}H_{30}O_5$) (or its sodium salt form, Beraprost sodium ($C_{24}H_{29}NaO_5$)) or Iloprost ($C_{22}H_{32}O_4$) will slow or stop the progression of COPD and become a much more effective treatment than steroids and the bronchodilators prescribed today. The treatment is also for COPD patients with eosinophilia that are incompletely treated with steroids. The treatment aims at addressing steroid-unresponsive disease components of COPD including pulmonary hypertension (and pulmonary intravascular inflammation) and bronchiectasis with the overall goal of decreasing the number of exacerbations and halting the disease progression.

Zileuton ($C_{11}H_{12}N_2O_2S$) can be used in place of DEC in the proposed combination, however, Zileuton will not provide all of the anticipated benefits of DEC; it is not known to have antioxidant and anti-viral properties. Beraprost ($C_{24}H_{30}O_5$) (or Beraprost sodium ($C_{24}H_{29}NaO_5$) or Iloprost ($C_{22}H_{32}O_4$) can also be substituted with other vasodilators such as Treprostinil, Treprostinil Palmitil, or Cicaprost. Beraprost sodium ($C_{24}H_{29}NaO_5$) may be in several forms that also include Beraprost sodium modified release BPS-MR (Ouditz R J et al. AJRCCM (Abstract) 2020 or Beraprost sodium long acting (TRK-100STP) Kunieda T. et al, Int. Heart J, 2009.

The present invention is based in part on the knowledge of the inventors that the lung endothelial cells are dysfunctional in COPD/emphysema and therefor, preventing the loss of protection to the endothelial cells is important and Beraprost or Iloprost will address this issue. Further Beraprost or Iloprost improves gas exchange and exercise tolerance in patients with pulmonary hypertension and COPD.

The present invention is based in part on the knowledge of the inventors that fluvoxamine has been shown to reduce inflammation via stimulation of the Sigma-1 receptor and is an antidepressant, and that COPD patients are often depressed as the disease progresses.

The present invention in based in part on discovering that among other benefits, DEC or Zileuton inhibit the synthesis of LTB4 and LTC4; both of these inflammatory mediators have been detected in high concentrations in exhaled air samples or the sputum obtained from COPD patients. LTB4 contributes to airway edema, and it is highly chemotactic (after spilling over into the systemic circulation it "calls" more inflammatory cells into the lung making inflammation worse). LTC4 causes contraction of airway smooth muscles and of lung vessels and in this way contributes to COPD, bronchospasm, and pulmonary hypertension.

The present invention in based in part on learning that DEC has proven to reduce the viral load in HIV patients by 54%, and as such assists in fighting viruses and should be very helpful in protecting against pneumonia and viral and bacterial airway infections common for COPD patients using current steroid-containing treatments.

The present invention in based in part on discovering that DEC can reduce the activation of the master transcription factor NFkappaB; by reducing this activation DEC can mitigate the production of inflammatory cytokines like IL-1, IL-6 and inflammatory agonists like TNF-alpha.

Using DEC or Zileuton, it is expected to reduce the vascular and airway inflammation in pulmonary hypertension stopping COPD disease progression.

The present invention in based in part in discovering that DEC or Zileuton can be formulated to be inhaled, a delivery mechanism that has never been developed for either of these drugs, thereby delivering DEC or Zileuton directly to the lungs.

The present invention in based in part in discovering that fluvoxamine can be formulated to be inhaled, a delivery mechanism that has never been developed for this drug, thereby delivering fluvoxamine directly to the lungs.

The present invention in based in part on the knowledge that Beraprost or Beraprost sodium or Iloprost can be inhaled, and its action is limited to the lungs, without causing systemic hypotension, and reducing the production of inflammatory cytokines. Inflammatory mediators are not effectively controlled by steroid treatment and this component of lung inflammation is a likely cause for the smoldering nature of the airway and lung vessel disease. This component is likely involved when bacterial or viral infections cause disease exacerbations of COPD. Beraprost (or Beraprost sodium) or Iloprost can also be substituted with other vasodilators such as Treprostinil, Treprostinil, Palmitil, or Cicaprost.

The present invention takes advantage of the fact that either Beraprost (or Beraprost sodium) or Iloprost are both vasodilators and as such, can treat the pulmonary hypertension (PH) in those COPD patients that also have pulmonary hypertension, a subgroup of COPD patients with a particular bad prognosis. Beraprost (or Beraprost sodium) or Iloprost can also be substituted with other vasodilators such as Treprostinil, Treprostinil Palmitil, or Cicaprost.

The present invention takes advantage of the fact that either Beraprost (or Beraprost sodium) or Iloprost are vasodilators and discovering that they may inhibit pulmonary vasoconstriction and pulmonary hypertension. Beraprost (or Beraprost sodium) or Iloprost can also be substituted with other vasodilators such as Treprostinil, Treprostinil Palmitil, or Cicaprost.

The present invention is based on the fact that while an inhalable PDE4 inhibitor, for example CHF6001, developed by Chiesi Pharma (Lee J H, Kim H J, Lung 20015), has shown only a modest anti-inflammatory effect, such an inhalable PDE4 inhibitor when combined with DEC or Zileuton, with or without Beraprost, or with or without other vasodilators such as Treprostinil, Treprostinil Palmitil, or Cicaprost, and would be clinically more successful.

The present invention is based on the fact that an inhalable PDE4 inhibitor, for example CHF6001, while trials have shown this drug does help with inflammation and is not successful as a standalone treatment, and that combined with the combination with (1) DEC or Zileuton and (2) a co-drug of Beraprost or Beraprost sodium or Iloprost or another vasodilator would be clinically more successful.

The present invention is based on the fact that an inhalable PDE4 inhibitor, for example CHF6001, while trials have shown this drug does help with inflammation and is not successful as a standalone treatment, and that combined with the combination with (1) DEC or Zileuton and (2) a co-drug of Beraprost or Beraprost sodium or Iloprost or another vasodilator and (3) fluvoxamine would be clinically more successful.

The present invention is based on the fact that an inhalable PDE4 inhibitor, for example CHF6001, which was not fully effective as a sole treatment, when combined with the combination with (1) DEC or Zileuton plus a co-drug of Beraprost or Iloprost or another vasodilator and combined with (2) an existing steroid, beta-adrenergic agonists or muscarinic receptor blockers treatments would constitute a clinically successful treatment regimen.

The present invention is based on the fact that an inhalable PDE4 inhibitor, for example CHF6001, which was not fully effective as a sole treatment, when combined with the combination with (1) DEC or Zileuton plus a co-drug of Beraprost or Iloprost or another vasodilator and combined with (2) an existing steroid, beta-adrenergic agonists or muscarinic receptor blockers treatments and combined with (3) fluvoxamine would constitute a clinically successful treatment regimen.

The inventors are applying employing strategies that (1) inhibit the synthesis of LTB4 and LTC4, (2) decrease the production of tissue damaging inflammatory mediators, (3) prevent the dysfunction of endothelial cells (4) inhibit pulmonary vasoconstriction and to protect the lung vascular endothelial cells and decrease intra-vascular inflammation (5) inhibit or retard interstitial fibrosis in the COPD subtype that is characterized by emphysema, lung fibrosis and pulmonary hypertension (6) provide antiviral benefits (7) provide anti-oxidant properties that protect against lung tissue damage (8) offers anti-fibrotic action that protects against lung tissue scar formation and (9) prevent pulmonary emboli and (10) provide antidepressant benefits.

By including a PDE4 inhibitor as one embodiment of this invention, the inventors are employing a strategy of adding the benefits of DEC (or Zileuton) with or without the added benefits of a vasodilator drug and gain the PDE4 inhibitor benefit of additional inflammation reduction.

This invention pursues the strategic goals to protect the lung from developing further damage by employing the two core drugs (Beraprost and DEC) and alternative drugs that achieve these goals. This is unlike the current steroidal treatments, which do not prevent any further damage to the lungs. The primary two drugs are Beraprost (which can be substituted with Beraprost sodium or Iloprost) plus DEC (which can be substituted with Zileuton). As these drugs are safe and they can be used with other treatments, such as oxygen, beta-adrenergic receptor agonists and muscarinic receptor inhibitors and steroids, as such treatments on their own cannot prevent intravascular inflammatory and procoagulant mechanisms that pave the way to lung damage and heart failure. The choice of Beraprost (or Beraprost sodium) or Iloprost can also be substituted with other vasodilators such as Treprostinil, Treprostinil Palmitil, or Cicaprost. A PDE4 inhibitor can also be added to the forgoing combination.

The present invention recognizes that COPD can lead to death because of inflammatory organ damage of the lung. This learning and the understanding that inflammatory response in COPD patients has allowed the inventors to determine that a combination of drugs, specifically DEC (or Zileuton) plus either Beraprost (or Beraprost sodium or Iloprost) and also Fluvoxamine will address key pathobiological mechanisms that create the events that lead to continued destruction of the lung, loss of lung capacity and finally to a severely diminished quality of life and to death. The inventors' knowledge of the mechanism of action of these drugs, the specific inhibitory activities they will generate, allows the inventors to also in concert with either (a) DEC or Zileuton plus (b) either Beraprost (or Beraprost sodium) or Iloprost or another vasodilator and also Fluvoxamine apply the addition of inhaled steroids, beta-adrenergic agonists or muscarinic receptor blockers to this two-drug combination. The inventors also contemplate the addition of a PDE4 inhibitor to be added to the forgoing combination for some COPD patients where additional inflammation control is needed.

DEC as a single drug, can be a treatment independently of Beraprost (or Beraprost sodium) or Iloprost, and being administered via an inhaler or orally or intravenously, can also be used independently or in concert with existing steroid, beta-adrenergic agonists, or muscarinic receptor blockers treatments.

In conclusion, one exemplary embodiment of DEC and Beraprost, and alternative of DEC being substituted for Zileuton and an alternative of Beraprost being substituted with Beraprost sodium or Iloprost, or other vasodilators, both delivered by an inhaler, will have a therapeutic effect of reducing the processive lung damage from COPD. This treatment can also be used in concert with the existing steroid treatments and beta-adrenergic receptor agonists or muscarinic receptor blockers as the mechanisms of action are different. This treatment can also be combined with an inhalable PDE4 inhibitor, for example CHF6001, developed by Chiesi Pharma (Lee J H, Kim H J, Lung 20015). This treatment can also be combined with an inhalable form of fluvoxamine.

In one embodiment of the invention, the inventors are combining the use of DEC or Zileuton in COPD with Beraprost (or Beraprost sodium) or Iloprost as the mechanisms of action including the inhibition of chemotaxis—note that one of the most powerful chemotactic mediators is leukotriene B4 (LTB4), a product of activated 5-lipoxygenase (5-LO). LTB4 is produced by macrophages, eosinophils, neutrophils cooperating with erythrocytes and by activated endothelial cells. The specific hypothesis here is that LTB4 is of critical importance in the development of COPD due activation of chemotaxis and direct damage to the endothelium resulting in a smoldering COPD disease that continues to progress to death. DEC or Zileuton are expected to inhibit the synthesis of LTB4, and the synthesis of LTC4, a peptido-leukotriene that causes vaso- and bronchoconstriction. DEC, by inhibiting the activation of the master transcription factor NFkappaB, can reduce the production of cytokines and inflammatory mediators like TNF-alpha.

DEC has antioxidant properties and inhibits oxidant stress involved in COPD inflammation, Inhibition of inflammatory mediator production and DEC may inhibit activation of NFkappaB.

In one embodiment of the invention, only DEC is applied by an inhaler and may be used alone for some patients or used in combination with other current therapies. When used as a combination with other current therapies, it may be included in its own inhaler or together in an inhaler that administers a steroid and other co-drugs, such as beta-adrenergic agonists or muscarinic receptor blockers now used with steroids.

The present inventors also discovered that Beraprost (or Beraprost sodium) or Iloprost, which have historically been used for pulmonary arterial hypertension as vasodilators, will also be effective as their action when inhaled, is limited to the lungs-without causing systemic hypotension that would likely result from the administration of oral or intravenous doses.

In one embodiment, the present invention Beraprost (or Beraprost sodium) or Iloprost is delivered via an inhaler and may be used alone for some patients or used in combination with other current therapies. When used as a combination with other current therapies, it may be included in its own inhaler or together in an inhaler that administers a steroid and other co-drug, such as beta-adrenergic agonists or muscarinic receptor blockers. Beraprost or Beraprost sodium or Iloprost can also be substituted with other vasodilators such as Treprostinil, Treprostinil Palmitil, or Cicaprost.

In one embodiment, the present invention fluvoxamine is delivered via an inhaler and may be used alone for some patients or used in combination with other current therapies. When used as a combination with other current therapies, it may be included in its own inhaler or together in an inhaler that administers a steroid and other co-drug, such as beta-adrenergic agonists or muscarinic receptor blockers.

Yet another aspect of the invention comprises an inhalation device where in one embodiment the inhalation delivery device is a dry powder inhaler (DPI), metered dose inhaler (MDI), soft mist inhaler, or a nebulizer.

The composition of drugs as provided herein for use in an inhaler includes a pharmaceutically acceptable carrier, diluent, or excipient, and, in some exemplary embodiments, a propellant. The pharmaceutically acceptable carrier, diluent, or excipient in one embodiment is a solubilizing agent, and antioxidant, a stabilizing agent or a combination thereof.

The "pharmaceutically acceptable carrier, diluent or excipient" includes any and all solvents, diluents, or other liquid vehicle, dispersion or suspension aids, surface active agents, isotonic agents, thickening or emulsifying agents, preservatives, solid binders, lubricants and the like, as suited to the inhalation dosage form provided herein. Remington's Pharmaceutical Sciences, Sixteenth Edition, E W Martin (Mack Publishing Co., Easton, Pa., 1980) discloses various carriers used in formulating pharmaceutical compositions and known techniques for the preparation thereof. Except insofar as any conventional carrier medium is incompatible with the compounds such as by producing any undesirable biological effect or otherwise interacting in a deleterious manner with any other component(s) of the pharmaceutical composition, its use is contemplated to be within the scope of this disclosure. Some examples of materials which can serve as pharmaceutically acceptable carriers include, but are not limited to, sugars such as lactose, glucose and sucrose; starches such as corn starch and potato starch; cellulose and its derivatives such as sodium carboxymethyl cellulose, ethyl cellulose and cellulose acetate, powdered tragacanth; malt; gelatin; talc; excipients such as cocoa butter and suppository waxes; oils such as peanut oil, cottonseed oil; safflower oil, sesame oil; olive oil; corn oil and soybean oil; glycols, such as propylene glycol; esters such as ethyl oleate and ethyl laurate; agar; buffering agents such as magnesium hydroxide and aluminum hydroxide; alginic acid; pyrogen free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator. "Pharmaceutically acceptable excipient or carrier" also relates to an excipient or carrier that is useful in preparing a pharmaceutical composition that is generally safe, nontoxic and neither biologically nor otherwise undesirable, and includes excipient that is acceptable for veterinary use as well as human pharmaceutical use. A "pharmaceutically acceptable excipient" as used in the specification and claims includes both one and more than one such excipient.

Administration of the proposed drug composition for treatment of COPD, asthma, pneumonia, bronchitis, cystic fibrosis, pulmonary edema, interstitial lung disease, sarcoidosis, idiopathic pulmonary fibrosis, acute respiratory distress syndrome, and pulmonary arterial hypertension to a patient in need thereof, in one embodiment, can be, for example, with an inhalation delivery device such as a metered dose inhaler (MDI), dry powder inhaled (DPI), soft mist inhaler, or a nebulizer. The inhalation delivery device can contain and be used to deliver a single dose of the drug composition, or the device can contain and be used to deliver multi-doses of the drug composition of the present invention. The device, in one embodiment, is constructed to ascertain optimum metering accuracy and compatibility of its constrictive elements, such as container, valve and actuator with the formulation and could be based on a mechanical pump system, e.g., that of a metered-dose nebulizer, dry powder inhaler, soft mist inhaler, or a nebulizer. For example, pulmonary delivery devices include a jet nebulizer, electronic nebulizer, a soft mist inhaler, and a capsule-based dry powder inhaler.

In one embodiment, a metered dose inhalator (MDI) is employed as the inhalation delivery device for the compositions of the present invention. In a further embodiment, the drug composition of the invention is suspended in a propellant (e.g., hydrofluorocarbon) prior to loading into the MDI. The basic structure of the MDI comprises a metering valve, an actuator, and a container. A propellant is used to discharge the formulation from the device. The composition may consist of particles of a defined size suspended in the pressurized propellant(s) liquid, or the composition can be in a solution or suspension of pressurized liquid propellant(s). The propellants used are primarily atmospheric friendly hydrofluoroalkanes. The device of the inhalation system may deliver a single dose via, e.g., a blister pack, or it may be a multi dose in design. The pressurized metered dose inhalator of the inhalation system can be breath actuated to deliver an accurate dose of formulation. To ensure accuracy of dosing, the delivery of the formulation may be programmed via a microprocessor to occur at a certain point in the inhalation cycle. The MDI may be portable and handheld.

In one embodiment, a composition of the invention is administered via a metered dose inhaler (MDI) to a patient in need of treatment of COPD, asthma, pneumonia, bronchitis, cystic fibrosis, pulmonary edema, interstitial lung disease, sarcoidosis, idiopathic pulmonary fibrosis, acute respiratory distress syndrome, or pulmonary arterial hypertension. The drug composition, in one embodiment, is delivered via a MDI by the use of a propellant, for example, a chloro-fluorocarbon (CFC) or a fluorocarbon. In one embodiment, where delivery is via an MDI, the compound is suspended or dissolved directly in a propellant solution. The patient, in one embodiment, is administered the drug composition of the invention once daily, twice daily or three times daily or more if needed. In one embodiment, each administration comprises 1 to 5 doses (puffs) from an MDI, for example 1 dose (1 puff), 2 dose (2 puffs), 3 doses (3 puffs), 4 doses (4 puffs) or 5 doses (5 puffs). The MDI, in one embodiment, is small and transportable by the patient.

In another embodiment, the drug composition is administered via a nebulizer to a patient in need of treatment of COPD, asthma, pneumonia, bronchitis, cystic fibrosis, pulmonary edema, interstitial lung disease, sarcoidosis, idiopathic pulmonary fibrosis, acute respiratory distress syndrome, or pulmonary arterial hypertension. The administration occurs, in one embodiment, once daily or twice daily, three times daily, every other day or once weekly.

In one embodiment, a composition of the present invention is administered to a patient in need of treating COPD, asthma, pneumonia, bronchitis, cystic fibrosis, pulmonary edema, interstitial lung disease, sarcoidosis, idiopathic pulmonary fibrosis, acute respiratory distress syndrome, or pulmonary arterial hypertension via a dry powder inhaler (DPI) to a patient in need of treatment. The patient, in one embodiment, is administered the drug composition of the invention once daily or twice daily. In one embodiment, each administration comprises 1 to 5 doses (puffs) from a DPI, for example 1 dose (1 puff), 2 dose (2 puffs), 3 doses (3 puffs), 4 doses (4 puffs) or 5 doses (5 puffs). The DPI, in one embodiment, is small and transportable by the patient.

The compositions of the present invention may be used in any dosage dispensing device adapted for pulmonary administration. Accordingly, in one aspect, the present invention provides systems comprising one or more of the compositions described herein and an inhalation delivery device. The device, in one embodiment, is constructed to ascertain optimum metering accuracy and compatibility of its constructive elements, such as container, valve and actuator with the composition and could be based on a mechanical pump system, e.g., that of a metered-dose nebulizer, dry powder inhaler, metered dose inhaler (MDI), soft mist inhaler, or a nebulizer. For example, inhalation delivery devices include a jet nebulizer, electronic nebulizer, a soft mist inhaler, and a capsule-based dry powder inhaler, all of which are amenable for use with the compositions of the present invention.

The composition, in one embodiment, is administered via a nebulizer, which provides an aerosol mist of the composition for delivery to the lungs of a subject. A nebulizer type inhalation delivery device can contain the compositions of the present invention as an aqueous solution or a suspension. In generating the nebulized spray of the compositions for inhalation, the nebulizer type delivery device may be driven ultrasonically, by compressed air, by other gases, electronically or mechanically. The ultrasonic nebulizer device usually works by imposing a rapidly oscillating waveform onto the liquid film of the composition via an electrochemical vibrating surface. At a given amplitude the waveform becomes unstable, whereby it disintegrates the liquids film, and it produces small droplets of the composition. The nebulizer device driven by air or other gases operates on the basis that a high-pressure gas stream produces a local pressure drop that draws the liquid composition into the stream of gases via capillary action. This fine liquid stream is then disintegrated by shear forces.

A nebulizer type inhalation delivery device can contain the compositions of the present invention as a solution, usually aqueous, or a suspension. For example, the composition can be suspended in saline and loaded into the inhalation delivery device. In generating the nebulized spray of the compositions for inhalation, the nebulizer delivery device may be driven ultrasonically, by compressed air, by other gases, electronically or mechanically (e.g., vibrating mesh or aperture plate). Vibrating mesh nebulizers generate fine particle, low velocity aerosol, and nebulize therapeutic solutions and suspensions at a faster rate than conventional jet or ultrasonic nebulizers. Accordingly, the duration of treatment can be shortened with a vibrating mesh nebulizer, as compared to a jet or ultrasonic nebulizer. Vibrating mesh nebulizers amenable for use with the methods described herein include the Philips Respironics I-Neb®, the Omron MicroAir, the Nektar Aeroneb®, and the PARI eFlow® Other devices that can be used with the compositions described herein include jet nebulizers (e.g., PARI LC Star, AKITA), soft mist inhalers, and capsule-based dry powder inhalers (e.g., PH&T Turbospin).

The nebulizer may be portable and handheld in design and may be equipped with a self-contained electrical unit. The nebulizer device may comprise a nozzle that has two coincident outlet channels of defined aperture size through which the liquid composition can be accelerated. This results in impaction of the two streams and atomization of the composition. The nebulizer may use a mechanical actuator to force the liquid composition through a multi-orifice nozzle of defined aperture size(s) to produce an aerosol of the composition for inhalation. In the design of single dose nebulizers, blister packs containing single doses of the composition may be employed.

The device can contain, and used to deliver, a single dose of the compositions of the invention, or the device can contain, and be used to deliver, multi-doses of the compositions of the invention.

In the present invention the nebulizer may be employed to ensure that the sizing of particles is optimal for positioning of the particle within, for example, the alveolar spaces.

A metered dose inhalator (MDI) may be employed as the inhalation delivery device for the compositions of the present invention. This device is pressurized (pMDI) and its basic structure comprises a metering valve, an actuator, and a container. A propellant is used to discharge the composition from the device. Suitable propellants, e.g., for MDI delivery, may be selected among such gases as fluorocarbons, chlorofluorocarbons (CFCs), hydrocarbons, hydrofluorocarbons, hydrofluoroalkane propellants (e.g., HFA-134a and HFA-227), nitrogen and dinitrogen oxide or mixtures thereof.

In one embodiment, a propellant is present in a composition intended for MDI delivery, and is selected from a fluorocarbon, chlorofluorocarbon, hydrocarbons, hydrofluoroalkane propellants (e.g., HFA-134a and HFA-227), nitrogen and dinitrogen oxide or mixtures thereof in embodiments of the present invention, the propellant is CFC-12 or an ozone-friendly, non-CFC propellant, such as 1,1,1,2-tetrafluoroethane (HFC 134a), 1,1,1,2,3,3,3-heptafluoropropane (HFA-227), HCFC-22 (difluorochloromethane), FIFA-152 (difluoroethane and isobutene), trans-1,3,3,3,-tetrafluoropro-1-ene (FIFO 1234ze) and 2,3,3,3,-tetrafluoroprop-1-ene (FIFO 1234yf), or combinations thereof.

The composition may consist of particles of a defined size, for example in a range from nano meters to 10 microns, such as 1 to 5 microns suspended in the pressurized propellant(s) liquid, or the composition can be in a solution or suspension of pressurized liquid propellant(s). The propellants used are primarily atmospheric friendly hydrofluorocarbons (HFCs). The inhalation delivery device, in one embodiment, delivers a single dose via, e.g., a blister pack, or it may be multi-dose in design. The pressurized metered dose inhalator of the inhalation system can be breath actuated to deliver an accurate dose of the composition. To ensure accuracy of dosing, the delivery of the composition may be programmed via a microprocessor to occur at a certain point in the inhalation cycle. The MDI may be portable and handheld.

Upon aerosolization, the aerosolized composition is in the form of aerosolized particles. The aerosolized composition can be characterized by the particle size of the aerosol, for example, by measuring the "mass median aerodynamic diameter" or "fine particle fraction" associated with the aerosolized composition. "Mass median aerodynamic diameter" or "MMAD" is normalized regarding the aerodynamic separation of aqua aerosol droplets and is determined by impactor measurements, e.g., the Anderson Cascade Impactor (ACI) or the Next Generation Impactor (NGI). The gas flow rate, in one embodiment, is 28 Liter per minute for the ACI and 5 liter per minute for the NGI.

Yet another aspect of the invention relates to the compositions described above in aerosolized form. Upon nebulization or aerosolization, the aerosolized composition is in the form of aerosolized particles. The aerosolized composition can be characterized by the particle size of the aerosol, for example, by measuring the "mass median aerodynamic diameter" or "fine particle fraction" associated with the aerosolized composition. "Mass median aerodynamic diameter" or "MMAD" is normalized regarding the aerodynamic separation of aqua aerosol droplets and is determined by impactor measurements, e.g., the Anderson Cascade Impactor (ACI) or the Next Generation Impactor (NGI). The gas flow rate, in one embodiment, is 28 Liter per minute for the ACI and 15 liter per minute for the NGI.

"Geometric standard deviation" or "GSD" is a measure of the spread of an aerodynamic particle size distribution. Low GSDs characterize a narrow droplet size distribution (homogeneously sized droplets), which is advantageous for targeting aerosol to the respiratory system. The average droplet size of the nebulized composition may be the same for both drugs or each may have its own respective size.

In the present invention as provided above, the nebulizer may be employed to ensure the sizing of particles is optimal for positioning of the particle within, for example, the alveolar spaces.

In some embodiments, such one or more additional active agents can be also administered in the same composition as the drug composition of the exemplary embodiment of DEC and Beraprost, and alternative of DEC being substituted for Zileuton and an alternative of Beraprost being substituted with Iloprost or Beraprost sodium or other prostacyclin analogs. In one embodiment, such one or more additional active agents can be administered separately, i.e., prior to, or subsequent to, the exemplary embodiment of DEC and Beraprost and the alternative compositions provided herein. Particular additional active agents (for example the inhalable PDE4 inhibitor CHF6001 or Fluvoxamine) that can be administered in combination with these drugs may depend the particular treatment method and disorder to be treated. In some cases, the additional active agents can be a prostacyclin analog such as Treprostinil, Treprostinil Palmitil, Cicaprost, a PDE4 inhibitor or other current treatments of as beta-adrenergic agonists or muscarinic receptor blockers now used with steroids.

The summary mechanisms of action Beraprost or Beraprost sodium or Iloprost will accomplish include improved gas exchange, better exercise tolerance, decreased production of inflammatory mediators, preventing the dysfunction of endothelial cells, inhibiting pulmonary vasoconstriction, protecting the lung vascular endothelial cells, decreasing intra-vascular inflammation, inhibiting or retarding interstitial fibrosis in the COPD subtype that is characterized by emphysema, lung fibrosis and pulmonary hypertension and prevention of pulmonary emboli and reduction of the number or severity of exacerbations.

The summary mechanisms of action for an DEC or Zileuton are inhibition of the enzyme 5-lipoxygenase, additional mechanisms of DEC actions are inhibition of oxidant stress, inhibition of NFkappaB-dependent gene transcription, reduction of viral load and anti-fibrotic actions. In the aggregate—by such molecular mechanisms—DEC inhibits chemotaxis and preserves normal endothelial cell function and inhibits vascular inflammation in pulmonary hypertension and reduces the number and/or severity of exacerbations.

The summary mechanisms of action for a PDE4 inhibitor are decreased concentrations of inflammatory mediators.

The summary mechanisms of action for Fluvoxamine are a reduction of inflammation and treatment of depression.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 4 is an illustration of smoking as one cause of the disease.

FIG. 5 in an illustration of the risk factors for the disease.

FIG. 6 is an illustration of the comparison to the current treatments and this proposed invention.

DETAILED DESCRIPTION

Figure 1:
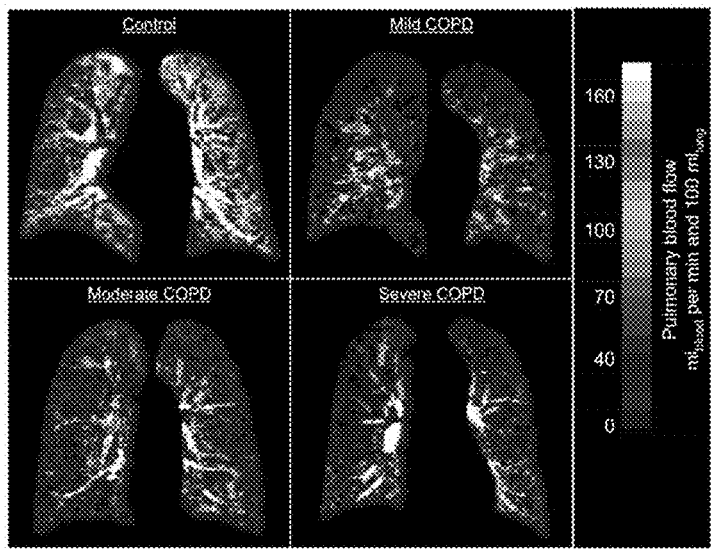
FIG. 1 illustrates the progression of the COPD disease in lungs.
Figure 2:
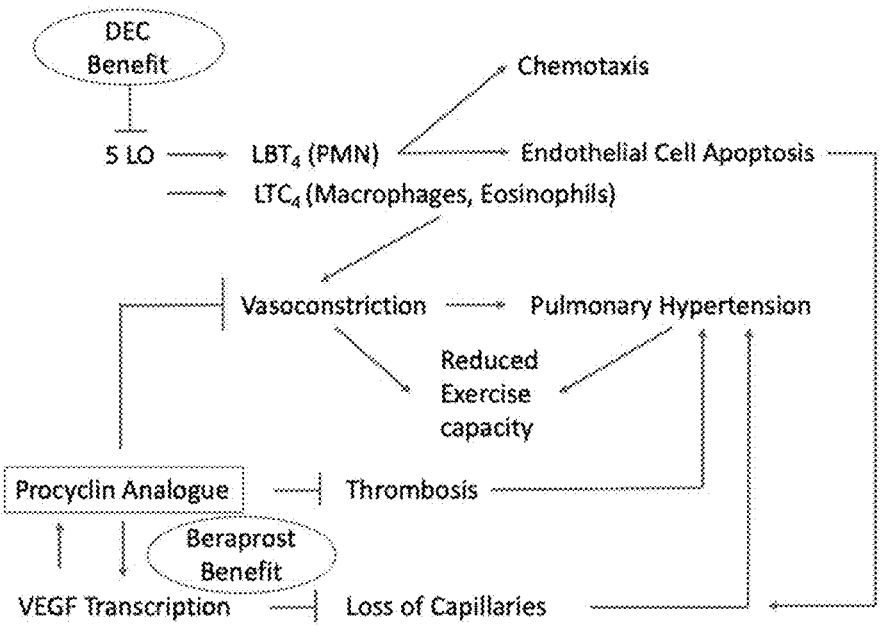
FIG. 2 illustrates the disease manifestation and the role of DEC and Beraprost.
Figure 3:
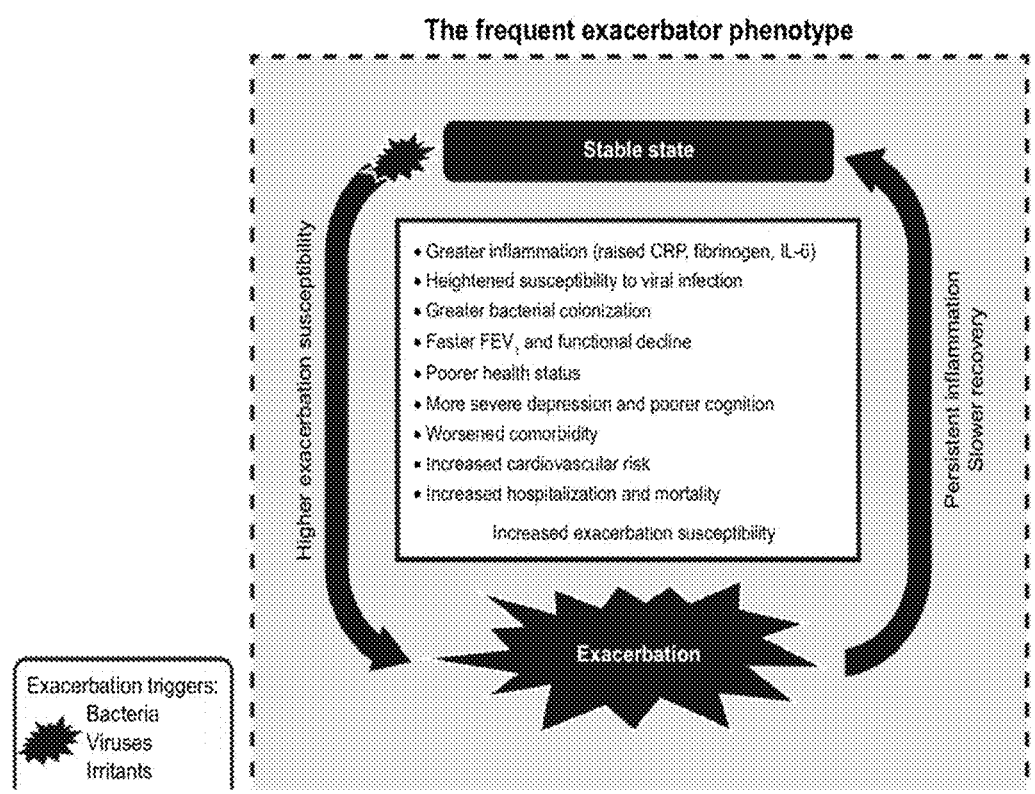
FIG. 3 illustrates a frequent exacerbator phenotype.

Aspects of the present invention are disclosed in the following description directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

The present invention is based on the discovery that DEC or Zileuton combined with a vasodilator such as Beraprost or Beraprost sodium or Iloprost, will address COPD disease and Asthma, Pneumonia, Bronchitis, Cystic Fibrosis, Pulmonary Edema, Interstitial Lung Disease, Sarcoidosis, Idiopathic Pulmonary Fibrosis and PAH mechanisms of action that steroids and other current medications do not effect. The present invention is also based on the discovery that Fluvoxamine has an additional mechanism of action to reduce inflammation. Specifically, Asthma, Pneumonia, Bronchitis, Cystic Fibrosis, Pulmonary Edema, Interstitial Lung Disease, Sarcoidosis, Idiopathic Pulmonary Fibrosis, and PAH and COPD disease, which is often described as a smoldering inflammation, requires a treatment that (1) reduces inflammation (2) lowers contraction of airway smooth muscles and of lung vessels (3) prevents the dysfunction of endothelial cells (4) inhibits pulmonary vasoconstriction (5) protects the lung vascular endothelial cells thereby Decreasing intravascular inflammation and (6) inhibits or retards Inhibition of interstitial fibrosis in the COPD subtype that is characterized by emphysema, lung fibrosis and pulmonary hypertension and (6) prevents pulmonary emboli.

The present inventors understood in order to prevent patients affected with Asthma, Pneumonia, Bronchitis, Cystic Fibrosis, Pulmonary Edema, Interstitial Lung Disease, Sarcoidosis, Idiopathic Pulmonary Fibrosis and PAH and COPD from progressing and develop ever worsening symptoms and then possible death, administration of drugs that inhibit steroid-resistant inflammation and protect the lung vascular endothelium must be selected. Such drugs must intervene early enough to prevent disease progression and also treat this disease and protect the lung from developing further damage. To do so, they realized the mechanisms of action these drugs have to provide is as follows:

(i) Inhibit chemotaxis of inflammatory cells into the lung and the heart.
(ii) Decrease vascular permeability and airway edema.
(iii) Decrease the activity of the master inflammatory mediator transcription factor NFkappaB activation in various cell types, including endothelial cells which likely develop an inflammatory phenotype (one characteristic of which is NFkappaB expression).
(iv) Avoid the inherent risk of current treatments whereby patients become susceptible to pneumonia or *Haemophilus influenzae* airway infections, or susceptible to developing osteoporosis.
(v) Provide a treatment that has anti-inflammatory properties and is also an antioxidant to inhibit the intravascular inflammatory and procoagulant mechanisms that pave the way to lung damage and heart failure.
(vi) Address LTB4, as it is of critical importance in the development of organ failure due to activation of chemotaxis and causing direct damage to the endothelium resulting in vascular leakage and in addition to address the synthesis of LTC4, a peptido-leukotriene that is vaso- and bronchospastic. The actions of vasospastic and bronchospastic in the context of chronic pulmonary inflammation are important in that these leukotriene-driven disease components contribute to the airflow limitation and shortness of breath and to pulmonary hypertension.
(vii) Inhibit the formation of leukotriene B4 that then inhibits the chemotaxis of neutrophils and macrophages into the injured lung and also endothelial cell damage.
(viii) Address cytokines that play an important part in the manifestation of the inflammatory response; of particular interest are IL-1, IL-6 and TNF-alpha.
(ix) Prevent the 5-lipoxygenase (5-LO) dependent expression signature and that 5-LO may work as a co-transcription factor IL-1beta, IL-6, BC12, ET, beta catenin, c-Myc. IL-1 and IL-6 are likely involved in COPD, in chronic lung infections and organ damage.
(x) Inhibit pulmonary vasoconstriction and provide protection against lung tissue fibrosis.
(xi) The inhaled drugs need to be deposited deep into the lungs-reaching the alveolar level—for maximum benefit.

It follows during treatment of Asthma, Pneumonia, Bronchitis, Cystic Fibrosis, Pulmonary Edema, Interstitial Lung Disease, Sarcoidosis, Idiopathic Pulmonary Fibrosis and PAH and COPD, patients with DEC or Zileuton provide some of the critical mechanisms of action needed.

The proposed mechanisms of action DEC are several fold: reduction of leukotriene production, protection against oxidative stress and inhibition of cytokine production via the interference with NFkappaB signaling, prevention of scar formation and in the case of DEC, antiviral benefits. Zileuton is not known to have anti-oxidant or anti-viral properties.

Based on this research and trials for other indications using DEC, with an antioxidant, anti-inflammatory, antiviral, antifibrotic and NFkappaB activity blocking properties, it is designated by the present inventors that treatment with DEC (or Zileuton) will provide the required mechanisms of action and together with Beraprost or Beraprost sodium or Iloprost will provide the other required mechanisms of action to arrest this disease.

In addition, the present inventors determined that DEC and Beraprost influence vascular inflammation. This discovery is based on the results of experiments conducted, by the inventor Norbert F. Voelkel, in rat models.

One of the present inventors, Norbert F. Voelkel, determined that these mechanisms involved in inflammation are amenable to modification by DEC and it is proposed by Norbert F. Voelkel to treat intravascular inflammation.

In some exemplary embodiments, COPD in a patient is treated by administering a therapeutically effective amount of a DEC (or Zileuton), the same applying to Asthma, Pneumonia, Bronchitis, Cystic Fibrosis, Pulmonary Edema, Interstitial Lung Disease, Sarcoidosis, Idiopathic Pulmonary Fibrosis and PAH. In one exemplary embodiment, Diethylcarbamazine ($C_{10}H_{21}N_3O$) (or Zileuton $C_{11}H_{12}N_2O_2S$) is administered. In an exemplary embodiment, the therapeutically effective amount of the DEC (or Zileuton) delivers 4 to 12 mg of DEC (or Zileuton) per day. In other exemplary embodiments, the therapeutically effect amount of DEC (or Zileuton) is 4 to 8 mg of DEC (or Zileuton) per day. This amount may be administered, for example, in some embodiments, in 4 to 1 doses delivered via an inhaler as 1 mg of DEC (or Zileuton) per "puff", or in other embodiments, in 4 to 12 doses delivered by an inhaler as 1 mg of DEC (or Zileuton) per "puff". In alternative embodiments, a single dose may include 2 puffs, each puff delivering 1 mg of DEC (or Zileuton). In further exemplary embodiments, the therapeutically effect amount of DEC (or Zileuton) can be greater than 6 mg of DEC (or Zileuton) per day, such 6 to 12 mg of DEC (or Zileuton) per day, and may be delivered by an inhaler in doses of 1 or 2 or 3 puffs, each puff delivering each puff delivering 1 mg of DEC (or Zileuton). The amount of DEC (or Zileuton) is adjusted according to the degree of reduction in sputum Leukotrienes.

The DEC or Zileuton may be administered in a composition comprising pharmaceutically acceptable carriers and/or excipients. The compositions may be administered in an intravenous form, in and inhaled form or an oral form, such as a tablet or a capsule. In some exemplary embodiments the composition is an inhaled form, either alone as DEC (or Zileuton) only or together with either Beraprost (or Beraprost sodium) or Iloprost, or combined with current inhalers that deliver (1) beta-adrenergic receptor agonists (bronchodilators), (2) inhaled corticosteroids to treat airway inflammation, (3) muscarinic receptor blockers-anticholinergics, and/or (4) a phosphodiesterase 4 inhibitor which has anti-inflammatory actions, such as roflumilast or CHF6001.

In addition to DEC or Zileuton, Beraprost (or Beraprost sodium) or Iloprost is to be used for the COPD disease and Asthma, Pneumonia, Bronchitis, Cystic Fibrosis, Pulmonary Edema, Interstitial Lung Disease, Sarcoidosis, Idiopathic Pulmonary Fibrosis and PAH treatment strategy. Beraprost (or Beraprost sodium) or Iloprost are vasodilator drugs designed for pulmonary arterial hypertension that have additional mechanisms of action that will improve the effectiveness of DEC (or Zileuton) through improvement of gas exchange, decrease in the production of inflammatory cytokines, prevention of the dysfunction of endothelial cells, inhibition of pulmonary vasoconstriction, protection of the lung vascular endothelial cells, decreasing intra-vascular inflammation, and inhibition or retarding Inhibition of interstitial fibrosis. In some exemplarily embodiments, Beraprost (or Beraprost sodium) or Iloprost may be delivered in a daily therapeutically effective amount of 20 to 60 µg. This amount may be administered, for example, by 3 to 6 doses or 4 to 8 doses delivered via an inhaler as 5 µg of Beraprost (or Beraprost sodium) or Iloprost per "puff". In some embodiments, a single dose may include 2 puffs, each puff delivering 5 µg of Beraprost (or Beraprost sodium) or Iloprost.

Figure 7:
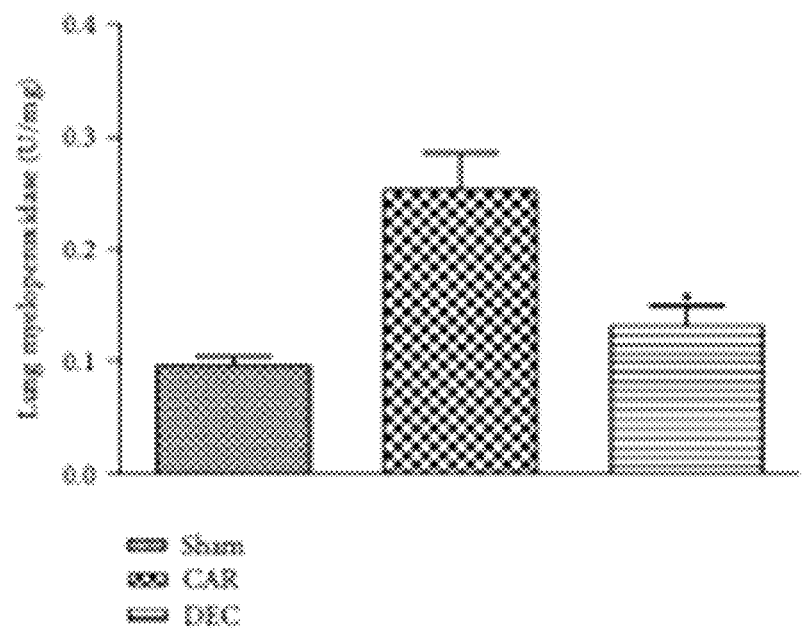
FIG. 7 illustrates that DEC treatment significantly inhibited neutrophil infiltration. The figure is reproduced from Ribeiro et al. The authors show in a mouse acute lung injury model that DEC pretreatment prevented the influx of neutrophils into the lung, using the neutrophil and macrophage marker myeloperoxidase.

Thus, it is expected that Beraprost (or Beraprost sodium) (or Iloprost), and DEC (or Zileuton) work synergistically in preventing intravascular inflammation. While Beraprost (or Beraprost sodium) or Iloprost is expected to reduce inflammation, improve gas exchange, protect endothelial cells, inhibit vasoconstriction, DEC (or Zileuton) is expected to decrease inflammation, inhibit neutrophil chemotaxis and NFkappaB-dependent gene transcription and DEC will provide virus protection by inhibiting viral replication. FIG. 7 illustrates that that DEC treatment significantly inhibited inflammatory cell infiltration (myeloperoxidase is produced by neutrophils and macrophages). The 5-LO enzyme that is expressed in activated lung vessel endothelial cells acts in the context of pulmonary vascular disease as an activator of gene expression. 5-LO leads to the production of leukotriene C4, which is the first and well-established action of 5-LO, and of leukotriene C4 which increases bronchoconstriction and pulmonary vasoconstriction by contracting smooth muscle cells in the bronchial airways and in the lung vessels.

Figure 8:
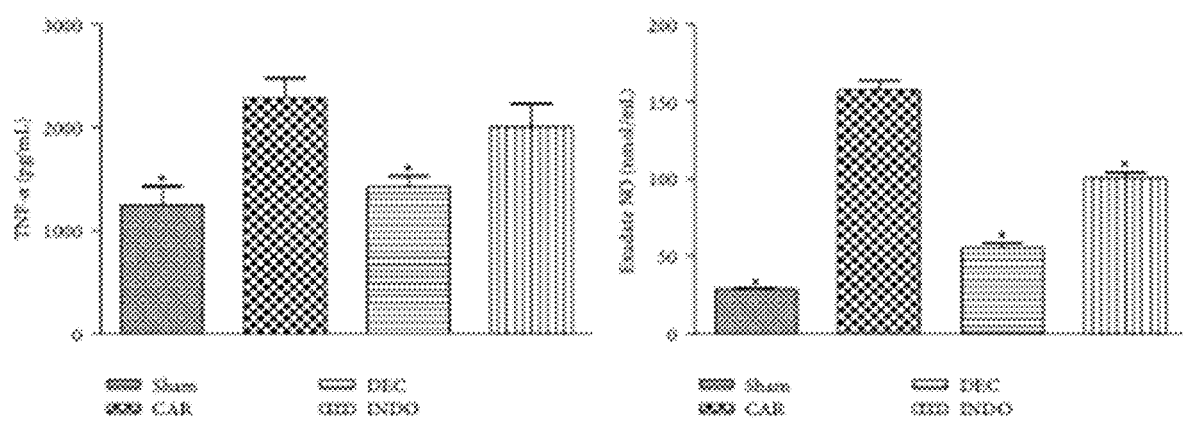
FIG. 8 illustrates the effect of DEC on carrageenan-induced TNF-alpha and nitric oxide production in the lung. The figure is reproduced from Ribeiro et al. (a) shows TNF-alpha levels were significantly elevated 4 hours after carrageenan administration in the CAR group in comparison to the sham group. DEC significantly reduced the TNF-alpha levels, but INDO did not reduce the TNF-alpha level in comparison to the CAR group. (b) shows that nitrite and nitrate levels, stable NO metabolites, were significantly increased in the pleural exudates 4 hours after carrageenan administration in comparison to the sham group, and DEC and INDO significantly reduced the nitrite and nitrate level in the exudates. Data expressed as means+/−S. E. M. from n=8 mice for each group *p<0.05 versus carrageenan. This pre-treatment inhibits the inflammation in the lung as shown by reduction in TNF-alpha and Nitric oxide production.

Thus, inhibiting 5-LO would also inhibit leukotriene C4 synthesis, which would remove a pulmonary vessel constricting substance. A second action is a non-enzymatic function of binding to the 5-LO activating protein (FLAP) on the envelope of the cell nucleus. Fitzpatrick and Lepley showed in 1998 that 5-LO co-precipitated with a subunit of the transcription factor NF-kappaB when they examined nuclear extracts. NF-kappaB controls the expression of genes encoding several inflammatory mediators. Thus, 5-LO, by binding to NF-kappaB in the cell nucleus would activate transcription of a number of genes in control of cell growth and genes encoding inflammatory mediators such as IL-1beta and IL-6—and also TNF alpha. FIG. 8 illustrates the effect of DEC on carrageenan-induced TNF-alpha and nitric oxide production in the lung and that DEC will inhibit TNF Alpha production. As a result of 5-LO inhibitor treatment, there would be a reduction in the vascular inflammation leading to halting of disease progression and assist disease reversal. LTB4 is important chemotactic leukotriene that is a product of the enzyme leukotriene A4 hydrolase—which is downstream from 5-LO. LTB4-has recently been studied in rats and it was demonstrated that LTB4 caused pulmonary-endothelial cell apoptosis (Tian W. et al Sci Transl Med. 2013 Aug. 28; 5(200):200ra117). Because effective inhibition of the 5-LO would also block LTB4 production, it is expected that 5-LO inhibitors in the treatment of COPD and Asthma, Pneumonia, Bronchitis, Cystic Fibrosis, Pulmonary Edema, Interstitial Lung Disease, Sarcoidosis, Idiopathic Pulmonary Fibrosis and PAH would also target LTB4-dependent pathomechanisms.

In exemplary embodiments, a PDE4 inhibitor may be included in the treatment with DEC (or Zileuton) with or without Beraprost (or Beraprost sodium) (or Iloprost) as described above. By including a PDE4 inhibitor, the invention employs a strategy of adding the benefits of DEC (or Zileuton) with or without the added benefits of a vasodilator drug Beraprost (or Beraprost sodium) (or Iloprost), and gain the PDE4 inhibitor benefit of additional inflammation reduction. When an inhalable PDE4 inhibitor used, for example, CHF6001, as developed by Chiesi Pharma (Lee J H, Kim H J, Lung 20015), it may be delivered in a daily therapeutically effective amount of 4 to 12 mg. This amount may be administered, for example, by 3 to 6 or 4 to 8 doses delivered via an inhaler, with has 1 mg of CHF6001 per "puff".

In exemplary embodiments, Fluvoxamine may be included in the treatment with DEC (or Zileuton) with or without Beraprost (or Beraprost sodium) (or Iloprost) or with or without a PDE4 inhibitor as described above. By including Fluvoxamine, the invention employs a strategy of adding the benefits of DEC (or Zileuton) with or without the added benefits of a vasodilator drug Beraprost (or Beraprost sodium) (or Iloprost), and with or without a PDE4 inhibitor and gain the Fluvoxamine benefit of additional inflammation reduction. When an inhalable Fluvoxamine it may be delivered in a daily therapeutically effective amount of 1 to 5 mg, This amount may be administered, for example, by 3 to 6 or 4 to 8 doses delivered via an inhaler, with has 0.5 to 2 mg of Fluvoxamine per "puff".

TABLE 2

| Drug Agent | Expected Effect On COPD and other Lung Diseases, such as Asthma, Pneumonia, Bronchitis, Cystic Fibrosis, Pulmonary Edema, Interstitial Lung Disease, Sarcoidosis, Idiopathic Pulmonary Fibrosis and PAH | Expected Combined |
|---|---|---|
| Beraprost or Iloprost, that can be substituted with Treprostinil, Treprostinil Palmitil, or Cicaprost | Improved Gas Exchange Decrease in the production of inflammatory cytokines prevention the dysfunction of endothelial cells inhibition of pulmonary vasoconstriction protection the lung vascular endothelial cells Decreasing intra-vascular inflammation inhibition or retarding interstitial fibrosis | Synergism in reducing airway and intravascular inflammation. Greater reduction in pulmonary hypertension than the reduction achieved by Beraprost or Iloprost alone. |
| DEC or Zileuton. | Anti-inflammation Antioxidant reduction in pulmonary artery pressure Anti-viral | A vasodilator, such as Beraprost or Iloprost combined with DEC or Zileuton are synergistic. In addition to their complementary mechanisms of action, the vasodilation of Beraprost or Iloprost allow DEC or Zileuton to be more effective. |
| A PDE4 Inhibitor | Reduced Inflammation | Reduced Inflammation |
| Fluvoxamine | Reduced Inflammation Reduced Depression | Reduced Inflammation Reduced Depression |

In terms of administration, some exemplary embodiments concerning the administration of both DEC (or Zileuton) and a co-drug comprising of Beraprost (or Beraprost sodium) (or Iloprost) in a single dose form or composition delivered by inhalation. In other exemplary embodiments DEC or Zileuton and co-drug of Beraprost (or Beraprost sodium) (or Iloprost are administered in separate compositions, which may be administered via the same route. Alternatively, these separate compositions may be administered by different routes. For example, the co-drug of Beraprost (or Beraprost sodium) and Iloprost may be in an inhalable form and the DEC (or Zileuton) may be in composition of an intravenous, oral, or inhalable form. If Fluvoxamine is added to the treatment, it may also be delivered as an injectable, oral or inhalable form.

In some exemplary embodiments, the DEC (or Zileuton)—with or without a co-drug of Beraprost (or Beraprost sodium) or Iloprost—is administered: DEC (or Zileuton) in a dose of 4-12 mg/day, which is a dose that can be shown to reduce sputum LTB4 and sputum eosinophilia.

In some exemplary embodiments, the Beraprost or Beraprost sodium or Iloprost—with or without a co-drug of DEC (or Zileuton) and with or without the co-drug of Fluvoxamine—is administered: Beraprost or Beraprost sodium in a dose of 20 to 60 microgram/day, which is a dose that does not cause systemic hypotension.

The compositions for DEC (or Zileuton) may comprise pharmaceutically acceptable carriers and/or excipients. The compositions may be in an intravenous form, and inhalable or an oral form, such as a tablet, a microtablet formulation, or a capsule. For compositions comprising Beraprost or Iloprost, with or without DEC or Zileuton, specific carriers and/or excipients may be added to provide the proper format for inhalable pumps. For compositions comprising Fluvoxamine, with or without DEC or Zileuton and with or without Beraprost or Iloprost, specific carriers and/or excipients may be added to provide the proper format for inhalable pumps.

In other exemplary. embodiments, any of the above oral forms of DEC or Zileuton may also be taken with one or more of the following current treatments as part of a single dose, as an additional oral form or as an additional component to one of the oral forms, for example: (1) prednisone (2) beta-adrenergic receptor agonists (bronchodilators), (3) inhaled corticosteroids to treat airway inflammation, (4) muscarinic receptor blockers-anticholinergics, and/or (5) a phosphodiesterase 4 inhibitor which has anti-inflammatory actions.

In other exemplary embodiments, any of the foregoing combinations with or without Beraprost or Beraprost sodium or Iloprost or with or without DEC or Zileuton may also be administered in concert with orally administered drugs currently prescribed to treat COPD and Asthma, Pneumonia, Bronchitis, Cystic Fibrosis, Pulmonary Edema, Interstitial Lung Disease, Sarcoidosis, Idiopathic Pulmonary Fibrosis and PAH such as prednisone or a PDE4 inhibitor.

One exemplary device for delivery of the drug combinations is an inhaler and may be a dry powder inhaler or aerosol, of which there are many designs. The drug delivery device (inhaler) is the device that delivers an adequate dose of the drugs deep into the airways, which in one exemplary embodiment delivery is to the alveolar level. In exemplary embodiments, the inhalation delivery device may be a dry powder inhaler (DPI), metered dose inhaler (MDI), soft mist inhaler, or a nebulizer.

In exemplary embodiments, the inhaler compositions may be pre-packaged in an inhalation delivery device.

The inhaler composition comprises the drug combinations, a pharmaceutically acceptable carrier, diluent, or excipient, which may include solubilizing agent, and antioxidant, a stabilizing agent or a combination thereof, and, in some exemplary embodiments, a propellant.

Exemplary embodiments of the inhaler compositions include a composition for direct delivery into to the lungs by inhalation with 2.5-4% by weight DEC or Zileuton, 1% to 5% by weight of a PDE4 inhibitor, and a propellent for inhalation delivery from an inhaler. The weight ratio is 5 μg of PDE4 inhibitor to 2 mg of DEC or Zileuton, or 10 μg to 4 mg. In some exemplary embodiments, the PDE4 inhibitor is CHF6001, as developed by Chiesi Pharma (Lee J H, Kim H J, Lung 20015). The DEC or Zileuton and PDE4 inhibitor have a particle size of 1 μm to 5 μm for suitable dispensing by the inhaler. The composition may further comprise a pharmaceutically acceptable carrier, diluent, or excipient, which may include solubilizing agent, and antioxidant, a stabilizing agent or a combination thereof.

In other exemplary embodiments the inhaler composition may further comprise, in addition to DEC or Zileuton and the PDE4 inhibitor, 0.00125% to 0.002% by weight of a vasodilator selected from group consisting of Beraprost, Beraprost sodium, Iloprost, Treprostinil, Treprostinil Palmitil and Cicaprost. In some exemplary embodiments, the vasodilator is Beraprost (or Beraprost sodium) or Illoprost. The weight ratio is 5 μg of vasodilator to 2 mg of DEC or Zileuton, or 10 μg to 4 mg. The vasodilator has a particle size of 1 μm to 5 μm for suitable dispensing by the inhaler.

In other exemplary embodiments the inhaler composition may further comprise, in addition to DEC or Zileuton and Fluvoxamine and the PDE4 inhibitor, 0.00125% to 0.002% by weight of a vasodilator selected from group consisting of Beraprost, Beraprost sodium, Iloprost, Treprostinil, Treprostinil Palmitil and Cicaprost. In some exemplary embodiments, the vasodilator is Beraprost (or Beraprost sodium) or Iloprost. The weight ratio is 5 μg of vasodilator to 2 mg of DEC or Zileuton, or 10 μg to 4 mg. The vasodilator has a particle size of 1 μm to 5 μm for suitable dispensing by the inhaler.

In other exemplary embodiments the inhaler composition may further comprise, in addition to DEC or Zileuton and Fluvoxamine, 0.00125% to 0.002% by weight of a vasodilator selected from group consisting of Beraprost, Beraprost sodium, Iloprost, Treprostinil, Treprostinil Palmitil and Cicaprost. In some exemplary embodiments, the vasodilator is Beraprost (or Beraprost sodium) or Illoprost. The weight ratio is 5 μg of vasodilator to 2 mg of DEC or Zileuton, or 10 μg to 4 mg. The vasodilator has a particle size of 1 μm to 5 μm for suitable dispensing by the inhaler.

In other exemplary embodiments the inhaler composition may further comprise, in addition to DEC or Zileuton and the PDE4 inhibitor and/or a vasodilator, 0.00125% to 0.002% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

In other exemplary embodiments the inhaler composition may further comprise, in addition to DEC or Zileuton and Fluvoxamine the PDE4 inhibitor and/or a vasodilator, 0.00125% to 0.002% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

In other exemplary embodiments the inhaler composition may further comprise, in addition to DEC or Zileuton and Fluvoxamine and/or a vasodilator, 0.00125% to 0.002% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

In other exemplary embodiments the inhaler composition may further comprise, Fluvoxamine the PDE4 inhibitor and/or a vasodilator, 0.00125% to 0.002% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

Exemplary embodiments of the inhaler composition also include a composition for direct delivery into to the lungs by inhalation with 2.5% to 4% by weight DEC or Zileuton and 0.00125% to 0.002% by weight of a vasodilator selected from group consisting of Beraprost, Beraprost sodium, Iloprost, Treprostinil, Treprostinil Palmitil and Cicaprost, and a propellent for inhalation delivery from the inhaler. The weight ratio is 5 μg of vasodilator to 2 mg of DEC or Zileuton, or 10 μg to 4 mg. The DEC or Zileuton and vasodilator have a particle size of 1 μm to 5 μm for suitable dispensing by the inhaler. In some exemplary embodiments, the vasodilator is Beraprost (or Beraprost sodium) or illoprost. The composition may further comprise a pharmaceutically acceptable carrier, diluent, or excipient, which may include solubilizing agent, and antioxidant, a stabilizing agent, or a combination thereof.

In other embodiments, the inhaler composition may further comprise, in addition to DEC or Zileuton and the vasodilator, 1% to 5% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

In other embodiments, the inhaler composition may further comprise, in addition to DEC or Zileuton, Fluvoxamine and the vasodilator, 1% to 5% by weight of at least one other active agent selected from the group consisting of prednisone, salbutamol, formoterol, a muscarinic receptor blocker, and a long-acting beta-adrenergic agonist. The at least one other active agent has a particle size of 1 μm to 5 μm for suitable dispensing by the inhaler.

In other embodiments, the inhaler composition may further comprise, in addition to DEC or Zileuton and the vasodilator and/or the at least one other active agent, 1% to 5% by weight of a PDE4 inhibitor. The weight ratio is 5 μg of PDE4 inhibitor to 2 mg of DEC or Zileuton, or 10 μg to 4 mg. In some exemplary embodiments, the PDE4 inhibitor is CHF6001, as developed by Chiesi Pharma (Lee J H, Kim H J, Lung 20015). The PDE4 inhibitor have a particle size of 1 μm to 5 μm for suitable dispensing by the inhaler.

In other embodiments, the inhaler composition may further comprise, in addition to DEC or Zileuton and Fluvoxamine and the vasodilator and/or the at least one other active agent, 1% to 5% by weight of a PDE4 inhibitor. The weight ratio is 5 μg of PDE4 inhibitor to 2 mg of DEC or Zileuton, or 10 μg to 4 mg. The weight ratio is 5 μg of PDE4 inhibitor to 1 mg of Fluvoxamine, or 5 µg to 5 mg. In some exemplary embodiments, the PDE4 inhibitor is CHF6001, as developed by Chiesi Pharma (Lee J H, Kim H J, Lung 20015). The PDE4 inhibitor have a particle size of 1 µm to 5 µm for suitable dispensing by the inhaler.

The at least one other active agent has a particle size of 1 µm to 5 µm for suitable dispensing by the inhaler 1% to 5% by weight of at least one other active agent selected from the group consisting of prednisone, salbutamol, formoterol, a muscarinic receptor blocker, and a long-acting beta-adrenergic agonist.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A method of treating COPD and inhibiting further lung damage development in a patient in need thereof, comprising administering to the patient a pharmaceutical composition comprising: an effective amount of diethylcarbamazine-citrate DEC-citrate); an effective amount of a prostacyclin analogue selected from the group consisting of Beraprost, Beraprost sodium, Iloprost, Treprostinil, Treprostinil Palmitil, and Cicaprost; and a buffering agent, wherein the composition is an aerosol, comprises a propellant, or is in an inhalation delivery device, and wherein the pharmaceutical composition inhibits inflammatory cell infiltration when administered to the lungs.

2. The method of claim 1, further comprising administering to the patient at least one other active agent selected from the group consisting of prednisone, salbutamol, formoterol, a muscarinic receptor blocker, and a long-acting beta adrenergic agonist.

3. The method of claim 1, further comprising administering to the patient a PDE4 inhibitor, wherein the PDE4 inhibitor is administered orally or by inhalation.

4. The method of claim 3, wherein the PDE4 is administered by inhalation, and the DEC, prostacyclin analogue, and the PDE4 inhibitor are administered together.

5. The method of claim 3, further comprising administering to the patient at least one other active agent selected from the group consisting of prednisone, salbutamol, formoterol, a muscarinic receptor blocker, and a long-acting beta-adrenergic agonist.

6. A pharmaceutical composition comprising: an effective amount of diethylcarbamazine-citrate (DEC-citrate); an effective amount of a prostacyclin analogue selected from the group consisting of Beraprost, Beraprost sodium, Iloprost, Treponistil, Treprostinil Palmitil, and Cicaprost; and a buffering agent, wherein the composition is an aerosol, comprises a propellant, or is in an inhalation-delivery device, and wherein the pharmaceutical composition inhibits inflammatory cell infiltration when administered to the lungs.

7. The pharmaceutical composition of claim 6, further comprising a phosphodiesterase 4 (PDE4) inhibitor.

8. The pharmaceutical composition of claim 7, wherein:
the DEC-citrate is 2.5% to 4% by weight of the pharmaceutical composition;
the prostacyclin analogue is 0.00125% to 0.002% by weight of the pharmaceutical composition; and
the PDE4 inhibitor is 1% to 5% by weight of the pharmaceutical composition.

9. The pharmaceutical composition of claim 6, further comprising:
at least one other active agent selected from the group consisting of prednisone, salbutamol, formoterol, a muscarinic receptor blocker, and a beta-adrenergic agonist.

10. The pharmaceutical composition of claim 6, wherein:
the DEC-citrate is 2.5% to 4% by weight of the pharmaceutical composition; and
the prostacyclin analogue is 0.00125% to 0.002% by weight of the pharmaceutical composition.

11. A method of treating COPD, Asthma, Pneumonia, Bronchitis, Cystic Fibrosis, Pulmonary Edema, Interstitial Lung Disease, Sarcoidosis, Idiopathic Pulmonary Fibrosis, and PAH and inhibiting further lung damage development in a patient in need thereof, comprising administering to the patient a pharmaceutical composition comprising: an effective amount of diethylcarbamazine-citrate (DEC-citrate); an effective amount of a prostacyclin analogue selected from the group consisting of Beraprost, Beraprost sodium, Iloprost, Treprostinil, Treprostinil Palmitil, and Cicaprost; and a buffering agent, wherein the composition is an aerosol, comprises a propellant, or is in an inhalation delivery device, and wherein the pharmaceutical composition inhibits inflammatory cell infiltration when administered to the lungs.

12. The pharmaceutical composition of claim 7, wherein the prostacyclin analogue is at least one of Beraprost, Beraprost sodium, and Iloprost.

13. The pharmaceutical composition of claim 7, having a weight ratio of about 5 µg PDE4 inhibitor to about 2 mg of DEC-citrate, and about 5 µg Beraprost or Beraprost sodium to about 2 mg of DEC-citrate.

14. The pharmaceutical composition of claim 6, wherein the prostacyclin analogue is at least one of Beraprost and Beraprost sodium.

15. The pharmaceutical composition of claim 6, formulated to be administered by a dry powder inhaler, metered dose inhaler, soft mist inhaler, or nebulizer.

16. The pharmaceutical composition of claim 6, wherein the composition is suspended or dissolved in a propellant for administration by a metered dose inhaler.

17. The pharmaceutical composition of claim 6, wherein the composition is formulated as a solution or suspension for administration by a nebulizer.

18. The pharmaceutical composition of claim 6, wherein the composition is formulated as a dry powder for administration by a dry powder inhaler.

19. The pharmaceutical composition of claim 6, wherein the composition is in a dry powder inhaler, metered dose inhaler, soft mist inhaler, or nebulizer.

20. An inhalation delivery device comprising the pharmaceutical composition of claim 6, wherein the inhalation delivery device is a dry powder inhaler, metered dose inhaler, soft mist inhaler, or nebulizer.

21. A nebulizer comprising the pharmaceutical composition of claim 6.

22. The pharmaceutical composition of claim 6, further comprising fluvoxamine.

23. The pharmaceutical composition of claim 6, in the form of aerosolized particles prepared by aerosolization of the composition by a nebulizer.

24. The pharmaceutical composition of claim 6, wherein the composition does not comprise a PDE4 inhibitor.

* * * * *